(12) United States Patent
Tsuji et al.

(10) Patent No.: US 8,003,239 B2
(45) Date of Patent: *Aug. 23, 2011

(54) METHOD OF PRESERVING POLYMER ELECTROLYTE FUEL CELL STACK AND PRESERVATION ASSEMBLY OF POLYMER ELECTROLYTE FUEL CELL STACK

(75) Inventors: Yoichiro Tsuji, Osaka (JP); Eiichi Yasumoto, Kyoto (JP); Kazuhito Hatoh, Osaka (JP); Shinsuke Takeguchi, Osaka (JP); Hiroki Kusakabe, Osaka (JP); Shigeyuki Unoki, Osaka (JP); Shinichi Arisaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1259 days.

This patent is subject to a terminal disclaimer.

(21) Appl. No.: 11/151,634

(22) Filed: Jun. 13, 2005

(65) Prior Publication Data
US 2006/0014074 A1  Jan. 19, 2006

(30) Foreign Application Priority Data

Jun. 14, 2004 (JP) ................................. 2004-175046
Jun. 14, 2004 (JP) ................................. 2004-175049

(51) Int. Cl.
*H01M 6/00* (2006.01)
(52) U.S. Cl. ............. 429/48; 429/49; 429/400; 429/452
(58) Field of Classification Search .................... 429/49, 429/12, 13, 48
See application file for complete search history.

(56) References Cited

U.S. PATENT DOCUMENTS

| | | | | |
|---|---|---|---|---|
| 5,013,617 A | * | 5/1991 | Scheffler | 429/17 |
| 5,241,992 A | * | 9/1993 | Oehlbeck et al. | 137/897 |
| 5,361,035 A | * | 11/1994 | Meitzler et al. | 324/663 |
| 6,322,920 B1 | * | 11/2001 | Tomson | 429/34 |
| 6,358,637 B1 | | 3/2002 | Fuss | |
| 2003/0059659 A1 | | 3/2003 | Kamo et al. | |
| 2007/0243430 A1 | * | 10/2007 | Arisaka et al. | 429/19 |

FOREIGN PATENT DOCUMENTS

| | | |
|---|---|---|
| JP | 03-208262 A | 9/1991 |
| JP | 05-190196 A | 7/1993 |
| JP | 05-258762 A | 10/1993 |
| JP | 06-251788 A | 9/1994 |
| JP | 07-272738 A | 10/1995 |
| JP | 09-180747 A | 7/1997 |
| JP | 2002-093424 A | 3/2002 |
| JP | 2002-093448 A | 3/2002 |
| JP | 2003-317771 A | 11/2003 |
| JP | 2003317771 | * 11/2003 |

OTHER PUBLICATIONS

Office Action issued Nov. 10, 2010 by the U.S. Patent Office in related U.S. Appl. No. 12/903,340.

* cited by examiner

*Primary Examiner* — Ula C Ruddock
*Assistant Examiner* — Patricia Davis
(74) *Attorney, Agent, or Firm* — Panitch Schwarze Belisario & Nadel LLP

(57) ABSTRACT

A method of preserving a PEFC stack of the present invention is a method of preserving a PEFC stack that is provided with an oxidizing agent passage having an inlet and an outlet and extending through a cathode and a reducing agent passage having an inlet and an outlet and extending through an anode. The method comprises preserving the polymer electrolyte fuel cell stack in an uninstalled state under a condition in which an oxygen concentration within the oxidizing agent passage and within the reducing agent passage is lower than an oxygen concentration in atmospheric air.

18 Claims, 18 Drawing Sheets

METHOD OF PRESERVING POLYMER ELECTROLYTE FUEL CELL STACK AND PRESERVATION ASSEMBLY OF POLYMER ELECTROLYTE FUEL CELL STACK

BACKGROUND OF THE INVENTION

1. Field of the Invention

The present invention relates to a method of preserving a polymer electrolyte fuel cell stack and a preservation assembly of the polymer electrolyte fuel cell stack. Particularly, the present invention relates to a method of preserving a polymer electrolyte fuel cell stack in an uninstalled state, and a preservation assembly of the polymer electrolyte fuel cell stack.

2. Description of the Related Art

In the conventional method of stopping a polymer electrolyte fuel cell (hereinafter referred to as PEFC), supply of an oxidizing agent and a reducing agent is stopped and these materials remaining within the PEFC stack are purged by, for example, an inert gas such as nitrogen (see document 1). Thereafter, during a stopped state of the PEFC, an oxidizing agent passage and a reducing agent passage are typically filled with the inert gas or the like to inhibit entry of air into the PEFC stack (see document 2). Thereby, oxidization of an electrode catalyst layer within the PEFC stack and degradation of performance of the PEFC are inhibited. In addition, there has been disclosed a method of preserving the PEFC while maintaining a potential of a separator at a predetermined value during a power generation stopped state of the PEFC (see document 3).

When a membrane-electrode-assembly (MEA) is created, an electrode catalyst layer is formed by applying a coating material for formation of a catalyst layer onto a surface of a polymer electrolyte fuel cell membrane. The coating material for formation of the catalyst layer contains an alcoholic component as a solvent. As catalyst powder, for example, carbon powder carrying platinum-ruthenium alloy particles or platinum particles is used. The catalyst powder is mixed with an ethyl alcohol dispersion containing perfluorocarbonsulfonic acid polymers and produced into a paste. The paste is applied to a surface of the polymer electrolyte membrane to form the electrode catalyst layer. The solvent containing the alcohol component enters a part of a porous electrode catalyst layer and remains there after manufacturing the MEA.

As a method of improving a drawback that an ion resistance at an interface between the polymer electrolyte membrane and the electrode catalyst layer increases, and a drawback that an electron resistance at an interface between the electrode catalyst layer and a diffusion electrode layer increases because the electrode catalyst layer and the diffusion electrode layer are not firmly joined to each other, there has been disclosed a method of heating, pressurizing and integrating an element including a polymer electrolyte membrane sandwiched between two electrodes in a solvent (see e.g., document 4). Furthermore, there has been disclosed a method of heating and pressurizing a polymer electrolyte membrane and/or an electrode catalyst layer containing a solvent substantially without being immersed in the solvent (see e.g., document 5). In accordance with this method, because the solvent within a MEA vaporizes during a step of integration, swelling of the polymer electrolyte membrane that is due to the solvent is controlled, maintaining a desired joint state at the interface between the polymer electrolyte membrane and the catalyst layer.

[Document 1] Japanese Laid-Open Patent Application Publication No. Hei. 6-251788

[Document 2] Japanese Laid-Open Patent Application Publication No. Hei. 7-272738

[Document 3] Japanese Laid-Open Patent Application Publication No. 5-258762.

[Document 4] Japanese Laid-Open Patent Application Publication No. Hei. 3-208262

[Document 5] Japanese Laid-Open Patent Application Publication No. 2002-93424

SUMMARY OF THE INVENTION

As illustrated in the documents 1 through 3, it is known that an electrode catalyst layer is oxidized and thereby its performance degrades if it contacts an oxide such as air under the condition in which the electrode catalyst layer has reached a catalyst activation temperature after start of power generation.

However, inventors discovered that degradation of performance such as decrease of an output voltage, in particular, a noticeable increase in a voltage drop rate of the output voltage occurs if a long time period elapses before power generation starts after a PEFC stack is assembled. From studies conducted by the inventors, it has been found that an oxide of a solvent remaining on an electrode catalyst is a cause of the degradation of the performance.

Traditionally, little attention has been paid to the degradation of the performance before the start of the power generation of the PEFC among those skilled in the art. For this reason, the conventional stopping method of the PEFC addresses a condition after a service starts and is not intended to inhibit degradation of the electrode catalyst layer before a PEFC stack is incorporated into a PEFC system after manufactured. In other words, the conventional method of inhibiting degradation of performance of the PEFC is intended to inhibit degradation of performance of the PEFC. To be specific, since an inert gas or the like is supplied from an external peripheral device through pipes or the like connected to the oxidizing agent passage and the reducing agent passage of the PEFC stack, the conventional method is not applicable to the PEFC stack before assembled into the PEFC system, in particular, in a single piece state during storage or transportation.

The present invention has been developed to solve the above described problems, and an object of the present invention is to provide a method of preserving a polymer electrolyte fuel cell stack, which is capable of controlling degradation of performance of the polymer electrolyte fuel cell stack during a time period that elapses from when the stack is placed in an uninstalled state until it is placed in an installation position and is practically used. Another object of the present invention is to provide a preservation assembly of the polymer electrolyte fuel cell stack which is capable of sufficiently controlling degradation of performance of the polymer electrolyte fuel cell stack particularly during a time period that elapses from when the stack is placed in the uninstalled state until it is placed in the installation position and is practically used.

After intensive studies conducted by the inventors to achieve the above described objects, they presumed that degradation of performance of the PEFC stack in the uninstalled state is caused by the fact that, in the electrode catalyst layer of the MEA, a remaining solvent such as alcohol reacts with oxygen to generate an oxide such as acetic acid which poisons the catalyst, and alternation of the electrode catalyst layer progresses due to the poisoning that lasts for a long period, causing degradation of performance of the electrode catalyst. According to the documents 4 and 5, vaporization of the solvent can control swelling of the polymer electrolyte membrane in manufacture of the MEA. However, according to the inventors' studies, this was not substantially effective in controlling degradation of performance of the PEFC stack in the uninstalled state. It was presumed that, since the solvent existing inside the porous electrode catalyst layer remained there without vaporization.

The inventors conceived the present invention based on the above presumption, and examined the effects. As a result, the effects were verified.

In order to solve the above mentioned problems, according to a 1st aspect of the present invention, there is provided a method of preserving a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, the method comprising the step of: preserving the polymer electrolyte fuel cell stack in an uninstalled state under a condition in which an oxygen concentration within the oxidizing agent passage and within the reducing agent passage is lower than an oxygen concentration in atmospheric air. In such a configuration, oxygen that contacts an oxygen agent side electrode catalyst layer and a reducing agent side electrode catalyst layer is decreased, and thereby oxidization of a solvent remaining in these electrode catalyst layers is sufficiently controlled. As a result, it is possible to sufficiently control degradation of performance of the polymer electrolyte fuel cell stack during a time period that elapses from when the polymer electrolyte fuel cell stack is placed in the uninstalled state until the fuel cell stack is placed at the installation position and is practically used.

As used herein, the term "uninstalled state" refers to a state before an assembled polymer electrolyte fuel cell stack is incorporated into a fuel cell system. More specifically, the uninstalled state may include a state before an oxidizing agent supply device is coupled to the oxidizing agent passage of the polymer electrolyte fuel cell stack or a state before a reducing agent supply device is coupled to the reducing agent passage, for example, a state in which the polymer electrolyte fuel cell stack is being preserved or transported. It shall be appreciated that the polymer electrolyte fuel cell stack in the uninstalled state may include a polymer electrolyte fuel cell stack that has gone through an electrochemical reaction during a short time period after manufactured. For example, the polymer electrolyte fuel cell stack in the uninstalled state may include a polymer electrolyte fuel cell stack after a performance check test, and a polymer electrolyte fuel cell stack that has performed a power generation process described later. Furthermore, the polymer electrolyte fuel cell stack in the uninstalled state may include a polymer electrolyte fuel cell stack which is being manufactured according to the preservation method of the present invention. For example, in a manufacturing method in which the MEA is stacked and is preserved in a temporarily fastened state, and the polymer electrolyte fuel cell stack is finally assembled with current collecting plates, end plates, etc, disposed at both ends thereof, when or just before incorporated into the polymer electrolyte fuel cell system, this temporarily fastened state substantially corresponds to the uninstalled state of the polymer electrolyte fuel cell stack.

In order to reliably obtain the effects of the present invention, according to a 2nd aspect of the present invention, the method of preserving a polymer electrolyte fuel cell stack may further comprise the steps of: decreasing the oxygen concentration within the oxidizing agent passage and within the reducing agent passage of the polymer electrolyte fuel cell stack in the uninstalled state to less than the oxygen concentration in atmospheric air; and sealing the inlet and the outlet of the oxidizing agent passage within which the oxygen concentration has been decreased and the inlet and the outlet of the reducing agent passage within which the oxygen concentration has been decreased.

In order to reliably obtain the effects of the present invention, according to a 3rd aspect of the present invention, in the method of preserving a polymer electrolyte fuel cell stack, in the step of decreasing the oxygen concentration, the oxygen concentration within the oxidizing agent passage and within the reducing agent passage may be decreased to not less than 10 ppm and not more than $1 \times 10^3$-ppm.

In order to reliably obtain the effects of the present invention, according to a 4th aspect of the present invention, in the method of preserving a polymer electrolyte fuel cell stack, the step of decreasing the oxygen concentration may include filling a replacement gas in the oxidizing agent passage and the reducing agent passage; and the step of sealing the inlets and the outlets may include attaching sealing units to the inlet and the outlet of the oxidizing agent passage filled with the replacement gas and to the inlet and the outlet of the reducing agent passage filled with the replacement gas.

According to a 5th aspect of the present invention, in the method of preserving a polymer electrolyte fuel cell stack, at least one of the sealing units used in the step of sealing the inlets and the outlets may include an oxygen removing agent container comprised of a connecting portion having an opening connected to the oxidizing agent passage or to the reducing agent passage and a base portion filled with an oxygen removing agent therein, and the connecting portion may be provided with an element that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage. In such a configuration, since the oxygen removing agent is capable of continuously removing the oxygen from the interior of the oxidizing agent passage and from the interior of the reducing agent passage, the oxygen concentration within the oxidizing agent passage and within the reducing agent passage can be maintained in a decreased state for a long time period.

According to a 6th aspect of the present invention, in the method of preserving a polymer electrolyte fuel cell stack, at least one of the sealing units used in the step of sealing the inlets and the outlets may include a replacement gas container comprised of a connecting portion having an opening connected to the oxidizing agent passage or to the reducing agent passage and a base portion filled with a replacement gas therein, and the connecting portion may be provided with a device that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage and that is capable of maintaining an ejecting pressure of the replacement gas within a predetermined range. In such a configuration, since the replacement gas container is capable of continuously inhibiting pressure reduction of the replacement gas within the oxidizing agent passage and within the reducing agent passage, the oxygen concentration within the oxidizing agent passage and within the reducing agent passage can be maintained in a decreased state for a long time period.

In order to reliably obtain the effects of the present invention, according to a 7th aspect of the present invention, in the method of preserving a polymer electrolyte fuel cell stack, at least one of the sealing units used in the step of sealing the inlets an the outlets may include a sealing plug.

According to an 8th aspect of the present invention, in the method of preserving a polymer electrolyte fuel cell stack, the step of decreasing the oxygen concentration may include filling water in the oxidizing agent passage and the reducing agent passage; and the step of sealing the inlets and the outlets may include attaching sealing units to the inlet and the outlet of the oxidizing agent passage filled with the water and to the inlet and the outlet of the reducing agent passage filled with the water. Thereby, since a water-soluble component of an organic solvent component remaining in the electrode catalyst layer is dissolved in water outside the catalyst layer and thereby is diluted, the partial oxidation reaction and dehydration and condensation reaction of the water-soluble component in the electrode catalyst layer (including a reaction between water-soluble components, a reaction between partial oxidization products, and a reaction between the water-soluble solvent component and the partial oxidation product) are sufficiently inhibited. As a result, the effects of the present invention are reliably obtained.

According to a 9th aspect of the present invention, the method of preserving a polymer electrolyte fuel cell stack may further comprise the step of: maintaining the polymer electrolyte fuel cell stack at a temperature of higher than 0° C. and not higher than 25° C. after the step of sealing the inlets and the outlets. In such a temperature range, the partial oxidization reaction and the dehydration and condensation reaction of the organic solvent component remaining in the oxidizing agent passage and the reducing agent passage (including a reaction between organic solvent components, a reaction between partial oxidization products, and a reaction between the water-soluble solvent component and the partial oxidation product) are reliably inhibited, and mechanical damage to the MEA under a low temperature condition is easily and sufficiently inhibited.

According to a 10th aspect of the present invention, the method of preserving a polymer electrolyte fuel cell stack, may further comprise the step of: after the step of sealing the inlets and the outlets, packaging the polymer electrolyte fuel cell stack in a sealed state in a package element. In such a configuration, since entry of oxygen from the vicinity of the polymer electrolyte fuel cell stack into the oxidizing agent passage and the reducing agent passage is controlled, degradation of performance of the polymer electrolyte fuel cell stack is controlled more reliably.

In order to obtain the effects of the present invention, according to an 11th aspect of the present invention, in the method of preserving a polymer electrolyte fuel cell stack, the package element may include a flexible package element, and the polymer electrolyte fuel cell stack may be packaged in the sealed state by bonding the package element.

According to a 12th aspect of the present invention, in the method of preserving a polymer electrolyte fuel cell stack, the package element may include a rigid body container comprised of a base portion and a lid, and the polymer electrolyte fuel cell stack may be packaged in the sealed state by joining the base portion and the lid to each other. In such a configuration, since the container is constructed of a rigid body, damage to the polymer electrolyte fuel cell stack which may occur during transportation or the like can be inhibited. In addition, the container is re-usable.

According to a 13th aspect of the present invention, in the method of preserving a polymer electrolyte fuel cell stack, the package element may include a package element that is low in oxygen permeability. Since the polymer electrolyte fuel cell stack is thus packaged in a sealed state in the package element that is low in oxygen permeability, entry of oxygen that may permeate in small amount from a gasket of the polymer electrolyte fuel cell stack, into the stack, is controlled more reliably. In addition, since the package element that is low in oxygen permeability is also low in water permeability, humidity variation within the polymer electrolyte fuel cell stack is controlled, and thus damage to the polymer electrolyte fuel cell is inhibited.

According to a 14th aspect of the present invention, the method of preserving a polymer electrolyte fuel cell stack may further comprise the step of: causing the polymer electrolyte fuel cell stack to perform a power generation process. By thus causing the polymer electrolyte fuel cell stack to perform the power generation process, the solvent or unwanted substances such as metal remaining inside the polymer electrolyte fuel cell stack can be removed along with the water generated through the electrochemical reaction. As a result, degradation of performance of the polymer electrolyte fuel cell stack is further controlled.

In order to reliably obtain the effects of the present invention, according to a 15th aspect of the present invention, in the method of preserving a polymer electrolyte fuel cell stack, a current density in the step of causing the polymer electrolyte fuel cell stack to perform the power generation process may be not less than 0.1 A/cm$^2$ and not more than 0.4 A/cm$^2$ per area of the electrode catalyst layers.

In order to reliably obtain the effects of the present invention, according to a 16th aspect of the present invention, in the method of preserving a polymer electrolyte fuel cell stack, a power generation time period in the step of causing the polymer electrolyte fuel cell stack to perform the power generation process may be 3 hours or more.

In order to reliably obtain the effects of the present invention, according to a 17th aspect of the present invention, in the method of preserving a polymer electrolyte fuel cell stack, a power generation time period in the step of causing the polymer electrolyte fuel cell stack to perform the power generation process may be a time period that elapses until a voltage variation is decreased to 2 mV/h or less.

In order to reliably obtain the effects of the present invention, according to a 18th aspect of the present invention, in the method of preserving a polymer electrolyte fuel cell stack, the step of causing the polymer electrolyte fuel cell stack to perform the power generation process may be performed within 300 hours after the polymer electrolyte fuel cell stack is manufactured.

According to a 19th aspect of the present invention, there is provided a preservation assembly of a polymer electrolyte fuel cell stack, comprising: a an uninstalled polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage; and sealing units including sealing plugs or containers and configured to seal the inlet and the outlet of the oxidizing agent passage within which an oxygen concentration has been decreased and to seal the inlet and the outlet of the reducing agent passage within which the oxygen concentration has been decreased. In such a construction, oxygen that contacts the oxygen agent side electrode catalyst layer and the reducing agent side electrode catalyst layer is decreased, and thereby oxidization of the solvent remaining in these electrode catalyst layers is sufficiently controlled. As a result, it is possible to achieve the preservation assembly of the polymer electrolyte fuel cell stack that is capable of sufficiently controlling degradation of performance of the polymer electrolyte fuel cell stack during a time period that elapses from when the polymer electrolyte fuel cell stack is placed in the uninstalled state until it is placed at an installation position and practically used.

In order to reliably obtain the effects of the present invention, according to a 20th aspect of the present invention, in the preservation assembly of a polymer electrolyte fuel cell stack, the oxygen concentration within the oxidizing agent passage and within the reducing agent passage may have been decreased to not less than 10 ppm and not more than $1 \times 10^3$ ppm.

In order to reliably obtain the effects of the present invention, according to a 21st aspect of the present invention, in the preservation assembly of a polymer electrolyte fuel cell stack, the oxidizing agent passage and the reducing agent passage may be filled with a replacement gas.

According to a 22nd aspect of the present invention, in the preservation assembly of a polymer electrolyte fuel cell stack, at least one of the sealing units may include an oxygen removing agent container comprised of a connecting portion having an opening connected to the oxidizing agent passage or the reducing agent passage and a base portion filled with an oxygen removing agent therein, and the connecting portion may be provided with an element that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage. In such a construction, since the oxygen removing agent is capable of continuously removing the oxygen within the oxidizing agent passage and within the reducing agent passage, the oxygen concentration within the oxidizing agent passage and within the reducing agent passage can be maintained in a decreased state for a long time period.

According to a 23rd aspect of the present invention, in the preservation assembly of a polymer electrolyte fuel cell stack, at least one of the sealing units may include a replacement gas container comprised of a connecting portion having an opening connected to the oxidizing agent passage or the reducing agent passage and a base portion filled with a replacement gas therein, and the connecting portion may be provided with a device that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage and that is capable of maintaining an ejecting pressure of the replacement gas within a predetermined range. In such a construction, since the replacement gas container is capable of continuously inhibiting pressure reduction of the replacement gas within the oxidizing agent passage and within the reducing agent passage, the oxygen concentration within the oxidizing agent passage and within the reducing agent passage can be maintained in a decreased state for a long time period.

According to a 24th aspect of the present invention, in the preservation assembly of a polymer electrolyte fuel cell stack, at least one of the sealing units may include a sealing plug.

According to a 25th aspect of the present invention, in the preservation assembly of a polymer electrolyte fuel cell stack, the oxidizing agent passage and the reducing agent passage may be filled with water. Thereby, since the water-soluble component of the organic solvent component remaining in the electrode catalyst layer is dissolved in water outside the catalyst layer and thereby is diluted, the partial oxidization reaction and dehydration and condensation reaction of the water-soluble component of the organic solvent remaining in the electrode catalyst layer (including a reaction between water-soluble components, a reaction between partial oxidization products, and a reaction between the water-soluble solvent component and the partial oxidation product), etc are sufficiently inhibited. As a result, the effects of the present invention are reliably obtained.

According to a 26th aspect of the present invention, the preservation assembly of a polymer electrolyte fuel cell stack may further comprise a package element configured to package, in a sealed state, the polymer electrolyte fuel cell stack to which the sealing units are attached. In such a construction, since entry of oxygen from the vicinity of the polymer electrolyte fuel cell stack into the oxidizing agent passage and the reducing agent passage is controlled, degradation of performance of the polymer electrolyte fuel cell stack is controlled more reliably.

In order to reliably obtain the effects of the present invention, according to a 27th aspect of the present invention, in the preservation assembly of the polymer electrolyte fuel cell stack, the package element may include a flexible package element, and the polymer electrolyte fuel cell stack may be packaged in the sealed state by bonding the package element.

In order to reliably obtain the effects of the present invention, according to a 28th aspect of the present invention, in the preservation assembly of the polymer electrolyte fuel cell stack, the package element may include a rigid body container comprised of a base portion and a lid, and the polymer electrolyte fuel cell stack may be packaged in the sealed state by joining the base portion and the lid to each other. In such a construction, since the container is constructed of a rigid body, damage to the polymer electrolyte fuel cell stack which may occur during transportation or the like can be inhibited. Furthermore, the container is re-usable.

In order to reliably obtain the effects of the present invention, according to a 29th aspect of the present invention, in the preservation assembly of the polymer electrolyte fuel cell stack, the package element may include a package element that is low in oxygen permeability. Since the polymer electrolyte fuel cell stack is thus packaged in a sealed state in the package element that is low in oxygen permeability, entry of oxygen that may permeate in small amount from a gasket of the polymer electrolyte fuel cell stack, into the stack, is controlled more reliably. In addition, since the package element that is low in oxygen permeability is also low in water permeability, humidity variation inside the polymer electrolyte fuel cell stack is controlled, and thus damage to the polymer electrolyte fuel cell is controlled.

According to a 30th aspect of the present invention, the preservation assembly of a polymer electrolyte fuel cell stack, may comprise the polymer electrolyte fuel cell stack that has been caused to perform a power generation process. Thereby, the solvent or the unwanted substances such as the metal remaining inside the polymer electrolyte fuel cell stack can be removed along with the water generated through the electrochemical reaction. As a result, degradation of performance of the polymer electrolyte fuel cell stack is further controlled. As used herein, the term "power generation process" refers to a process for causing the polymer electrolyte fuel cell stack to generate power.

The above and further objects and features of the invention will be more fully be apparent from the following detailed description with accompanying drawings.

DETAILED DESCRIPTION OF THE PREFERRED EMBODIMENTS

Hereinafter, embodiments of the present invention will be described with reference to the drawings.

Embodiment 1

A method of preserving a PEFC stack according to a first embodiment of the present invention will be described.

Figure 1:
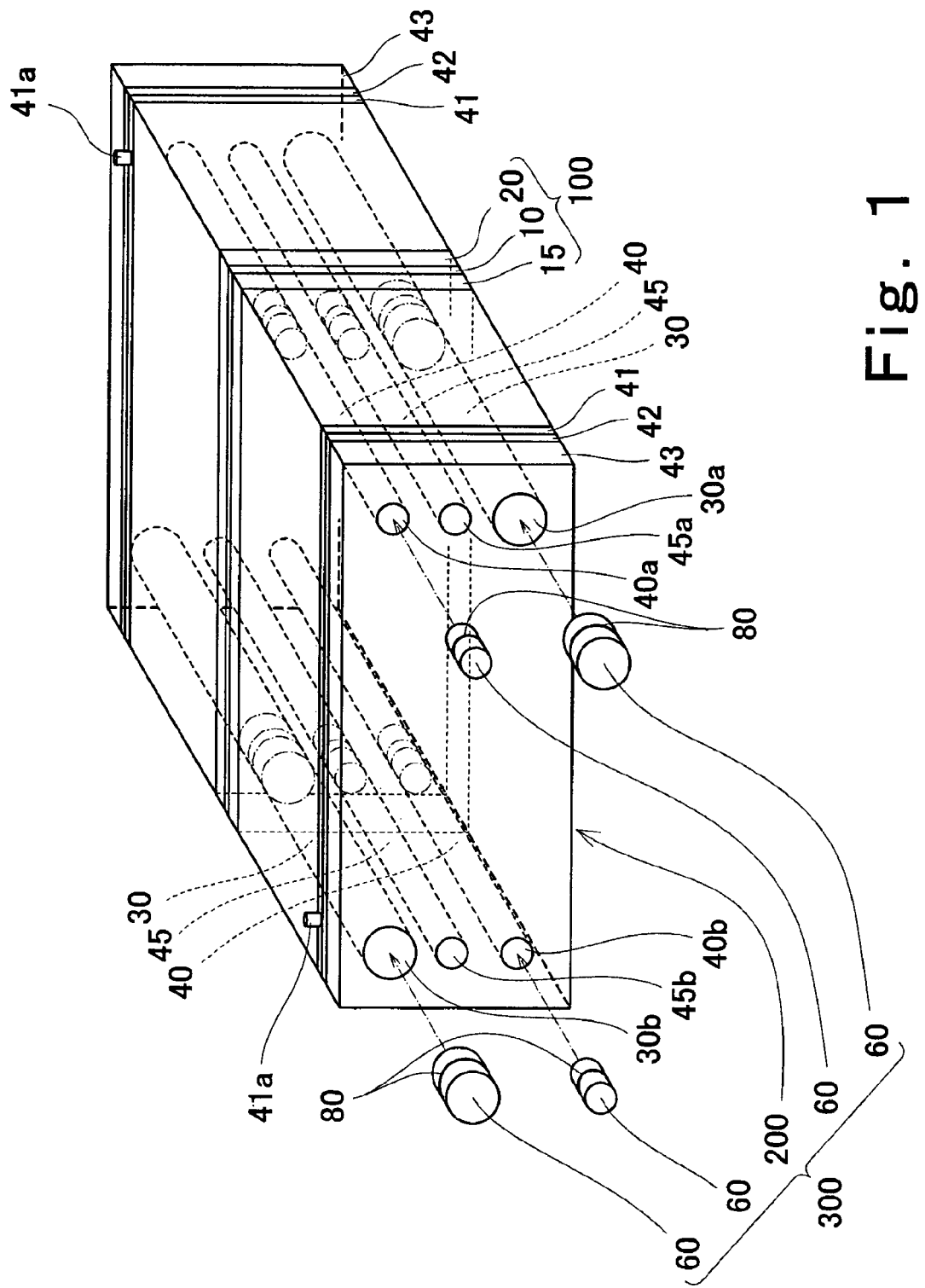
FIG. 1 is a schematic view of a preservation assembly of a PEFC stack according to a first embodiment of the present invention.
Figure 2:
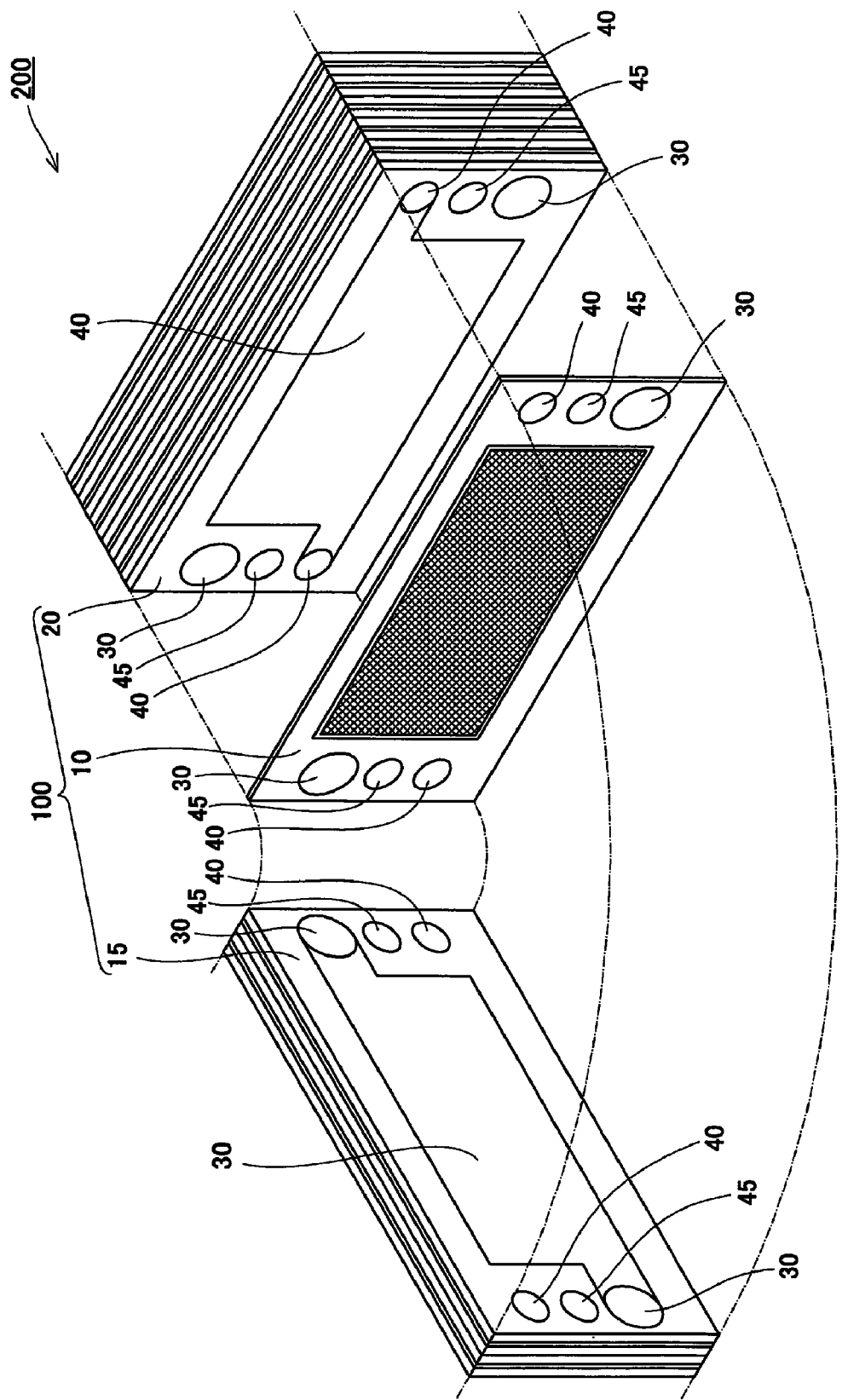
FIG. 2 is an exploded perspective view showing a structure of the PEFC stack included in the preservation assembly of the PEFC stack according to the first embodiment of the present invention.

FIG. 1 is a schematic view of a preservation assembly of a PEFC stack according to the first embodiment of the present invention. FIG. 2 is an exploded perspective view showing a structure of the PEFC stack included in the preservation assembly according to the first embodiment of the present invention.

A PEFC stack 200 including in a preservation assembly 300 of the first embodiment is formed by staking unit cells 100 that generate power through an electrochemical reaction. As shown in FIG. 2, the unit cell 100 includes a MEA 10, a cathode separator 15, and an anode separator 20, which are constructed of rectangular plates having substantially the same flat faces. The MEA 10 is sandwiched between the cathode separator 15 and the anode separator 20 such that one surface thereof is in contact with the cathode separator 15 and the other surface thereof is in contact with the anode separator 20. Each end portion of the cell 100 in the direction in which the cells 100 are stacked is in contact with an end plate 43 with a current collecting plate 41 and an insulating plate 42 interposed between the end portion and the end plate 43. The end plates 43 are fastened from opposite sides by fastener bolts (not shown). The PEFC stack 200 is employed in PEFC systems such as home cogeneration systems, two-wheeled automobiles, electric automobiles, hybrid electric automobiles, electric household appliances, and portable electric equipment such as portable computers, cellular phones, portable acoustic instruments, and portable information terminals.

Electric terminals 41a of the current collecting plates 41 are connected to an external load such as electric equipment. Through the electric terminals 41a, electric power is output. The PEFC stack 200 is provided with an oxidizing agent passage 30 and a reducing agent passage 40.

The oxidizing agent passage 30 is configured such that an oxidizing agent is supplied from an oxidizing agent passage inlet 30a and is divided to flow in the respective cells 100, and thereafter, the oxidizing agent gathers and is exhausted outside the PEFC stack 200 from an oxidizing agent passage outlet 30b. Typically, the oxidizing agent passage 30 is configured not to cross other passages, and is closed by sealing the oxidizing agent passage inlet 30a and the oxidizing agent passage outlet 30b. The reducing agent passage 40 is configured in the same manner. In this embodiment, as the oxidizing agent, oxygen or air is used. As the reducing agent, hydrogen or a material containing hydrogen is used.

In the first embodiment, the oxidizing agent passage inlet 30a and the reducing agent passage inlet 40a are formed at one end plate 43 of the PEFC stack 200. The reducing agent passage 40 is configured in the same manner.

The PEFC stack 200 is also provided with a coolant passage 45 through which a coolant such as water flows, in order to adjust the temperature of the PEFC stack 200. The coolant passage 45 is provided separately from the oxidizing agent passage 30 and the reducing agent passage 40. The coolant passage 45 is configured such that the coolant is supplied into the inside of the PEFC stack 200 from a coolant passage inlet 45a and is divided to flow between the respective of the stacked cells 100, and thereafter, the coolant is discharged outside the PEFC stack 200 from a coolant passage outlet 45b.

The cell 100 includes the MEA 10 and the separators 15 and 20 which are stacked. As shown in FIG. 2, the oxidizing agent passage 30 is formed between the MEA 10 and the cathode separator 15 and the reducing agent passage 40 is formed between the MEA 10 and the anode separator 20.

Figure 3:
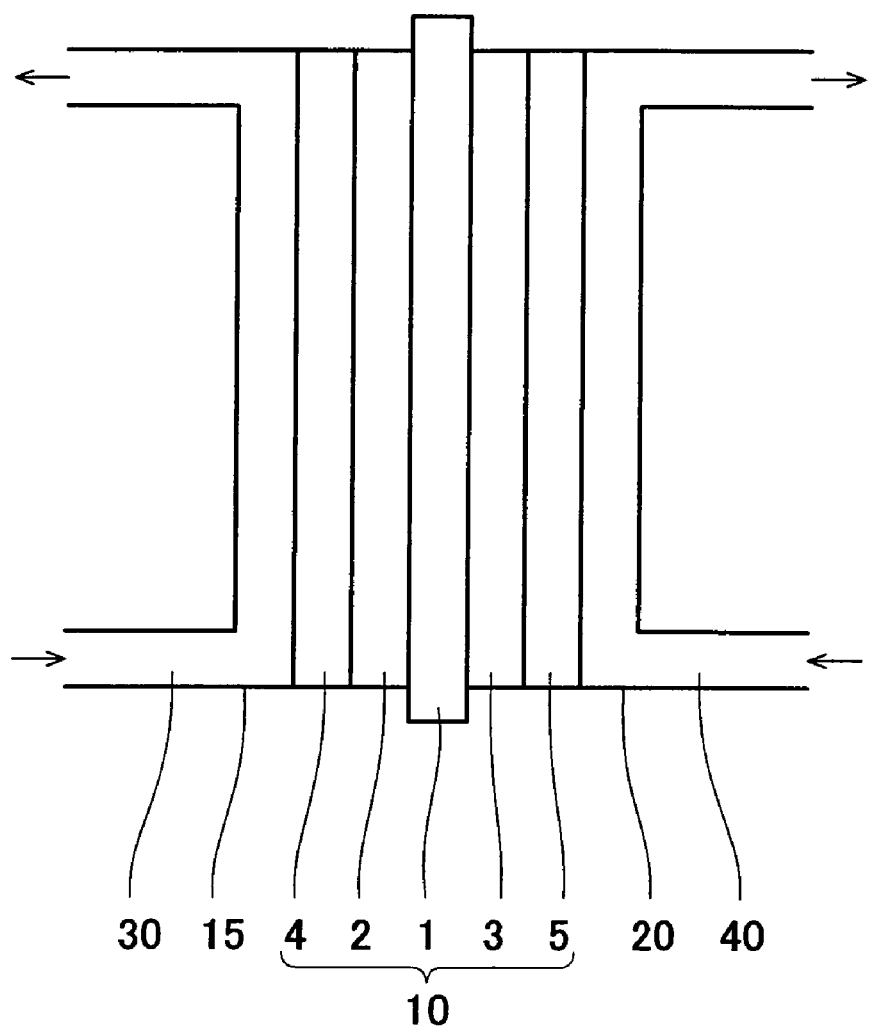
FIG. 3 is a schematic view showing a basic structure of a cell.

FIG. 3 is a schematic view showing a basic structure of the MEA 10.

The MEA 10 includes a polymer electrolyte membrane 1 comprised of an ion exchange membrane which selectively permeates hydrogen ions, a pair of electrode catalyst layers (oxidizing agent side electrode catalyst layer 2 and reducing agent side electrode catalyst layer 3) which are provided to sandwich the polymer electrolyte membrane 1 and are mainly comprised of carbon powder carrying platinum group based metal catalyst thereon, and a pair of diffusion electrode layers (oxidizing agent side diffusion electrode layer 4 and reducing agent side diffusion electrode layer 5) provided on outer surfaces of the pair of electrode catalyst layers 2 and 3. The diffusion electrode layers 4 and 5 are configured to have gas-permeability and electron conductivity, for example, a porous structure.

The oxidizing agent side electrode catalyst layer 2, the oxidizing agent side diffusion electrode layer 4, and the cathode separator 15 form a cathode.

The reducing agent side electrode catalyst layer 3, the reducing agent side diffusion electrode layer 5 and the anode separator 20 form an anode.

Subsequently, an operation of the PEFC stack 200 constructed as described above will be described. The oxidizing agent is divided to flow the respective cells 100 through the oxidizing agent passage 30. In the respective cells 100, the oxidizing agent is supplied to the cathode. Here, the oxidizing agent side diffusion electrode layer 4 is exposed to the oxidizing agent. Likewise, the hydrogen, or the reducing agent containing the hydrogen is supplied to the anode. Here, the reducing agent side diffusion electrode layer 5 is exposed to the hydrogen or the reducing agent containing the hydrogen flowing through the reducing agent passage 40.

The oxidizing agent permeates the oxidizing agent side diffusion layer 4 and reaches the oxidizing agent side electrode catalyst layer 2. Likewise, the reducing agent permeates the reducing agent side diffusion electrode layer 5 and reaches the reducing agent side electrode catalyst layer 3.

When an electric circuit between the oxidizing agent side electrode catalyst layer 2 and the reducing agent side electrode catalyst layer 3 is established through the cathode separator 15, the anode separator 20, the current collecting plates 41 (see FIG. 1) and an external electric circuit (not shown), hydrogen is ionized in the reducing agent side electrode catalyst layer 3.

The hydrogen ion permeates the polymer electrolyte membrane 1 and is bonded to the oxygen ion in the oxidizing agent side electrode catalyst layer 2 to generate water. The ionization of hydrogen causes an electron to be generated in the reducing agent side electrode catalyst layer 3. The electron travels to the external electric circuit (not shown) through the reducing agent side diffusion electrode layer 5, and generates electric power.

As should be appreciated from the above operation, the oxidizing agent side electrode catalyst layer 2 and the reducing agent side electrode catalyst layer 3 are exposed to the agents filled in the oxidizing agent passage 30 and the reducing agent passage 40, respectively. Therefore, in the fuel cell just after manufacture, the oxidizing agent side electrode catalyst layer 2 and the reducing agent side electrode catalyst layer 3 are exposed to the air filled in the oxidizing agent passage 30 and the reducing agent passage 40. Upon exposure to the air, a solvent remaining in the oxidizing agent side electrode catalyst layer 2 and the reducing agent side electrode catalyst layer 3 is oxidized, causing the catalysts in the oxidizing agent side electrode catalyst layer 2 and the reducing agent side electrode catalyst layer 3 to be poisoned.

Accordingly, the preservation assembly 300 of the PEFC stack 200 of the first embodiment of the present invention is constructed as follows.

The preservation assembly 300 of the PEFC stack 200 includes the PEFC stack 200 and sealing plugs 60. When the oxidizing agent passage 30 and the reducing agent passage 40 of the PEFC stack 200 are filled with a replacement gas and an oxygen concentration within the oxidizing agent passage 30 and the reducing agent passage 40 of the PEFC stack 200 is decreased to 1% ($1 \times 10^4$ ppm) or less, the inlet 30a and the outlet 30b of the oxidizing agent passage 30, and the inlet 40a and the outlet 40b of the reducing agent passage 40 are sealed by the sealing plugs (sealing units) 60. The sealing plugs used herein are made of PPS resin.

The replacement gas is an inert gas such as nitrogen, argon, or helium, or otherwise a gas such as hydrogen which does not become an oxidizing agent under operating environment of the PEFC. As used herein, the term "inert gas" is meant to include a gas with low reactivity, such as nitrogen which does not become a reactive material in an electrode reaction under the operating environment of the PEFC, in addition to rare gases.

While the sealing units are constructed of the sealing plugs 60 in the first embodiment, they may alternatively be constructed of valves having a sealed structure. For example, the valves may be attached to the inlet 30a and the outlet 30b of the oxidizing agent passage 30 and the inlet 40a and the outlet 40b of the reducing agent passage 40 and may be closed to seal the oxidizing agent passage 30 and the reducing agent passage 40. In this case, since the sealing units are integral with the PEFC stack 200, control and disposal of another elements, for example, the sealing plugs are omitted. The valves may desirably be hand-operated because a driving force is unnecessary during preservation, or otherwise may be a normal closed type power driven valve adapted to be closed when the driving force is not applied.

The PEFC stack 200 is a PEFC stack in an uninstalled state. The term "uninstalled state" refers to a state before an assembled PEFC stack is incorporated into a fuel cell system. Specifically, the uninstalled state refers to a state before an oxidizing agent supply device is coupled to the oxidizing agent passage of the PEFC stack or the reducing agent supply device is coupled to the reducing agent passage of the PEFC stack, for example, a state in which the PEFC stack is being preserved or transported. It shall be appreciated that the PEFC stack in the uninstalled state may include the PEFC stack that has gone through a short time electrochemical reaction after manufactured. For example, the PEFC stack in the uninstalled state may also include a PEFC stack after performance check test, and a PEFC stack after a predetermined power generation process. Furthermore, the PEFC stack in the uninstalled state may include a PEFC stack which is being manufactured according to the preservation method of the present invention. For example, in a manufacturing method in which the MEA is stacked and is preserved in a temporarily fastened state, and the PEFC stack is finally assembled with the current collecting plates, the end plates, etc disposed at both ends thereof, when or just before incorporated into the PEFC system, this temporarily fastened state substantially corresponds to the uninstalled state of the PEFC stack.

Subsequently, the preservation method of the PEFC stack according to the first embodiment of the present invention will be described.

Figure 4:
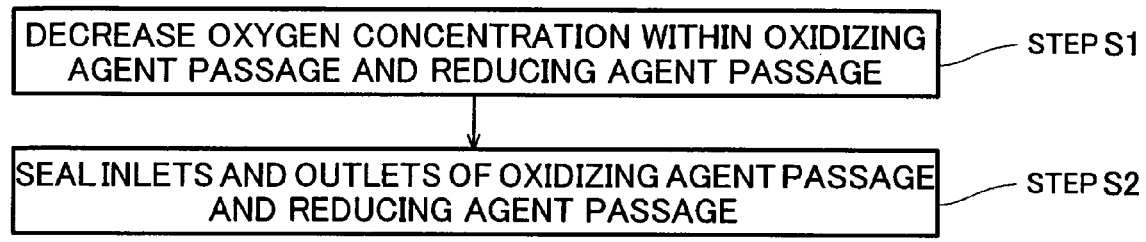
FIG. 4 is a block diagram showing a method of preserving the PEFC stack according to the first embodiment of the present invention.

FIG. 4 is a block diagram showing the preservation method of the PEFC stack according to the first embodiment of the present invention.

First, in step (decreasing step) S1, the oxygen concentration within the oxidizing agent passage 30 and the reducing agent passage 40 of the PEFC stack 200 in the uninstalled state is decreased to less than an oxygen concentration in atmospheric air. In this step, the replacement gas with the oxygen concentration of 1% ($1 \times 10^4$ ppm) or less is supplied from the oxidizing agent passage inlet 30a and the reducing agent passage inlet 40a to purge gases from the interior of oxidizing agent passage 30 and from the interior of the reducing agent passage 40, and is filled into the oxidizing agent passage 30 and the reducing agent passage 40.

Next, in step (sealing step) S2, the inlet 30a and the outlet 30b of the oxidizing agent passage 30 and the inlet 40a and the outlet 40b of the reducing agent passage 40 with the oxygen concentration decreased are sealed. In this step, when the oxygen concentration of the replacement gas which is exhausted from the oxidizing agent passage outlet 30b and the reducing agent passage outlet 40b is decreased to 1% ($1 \times 10^4$ ppm) or less, the oxidizing agent passage outlet 30b and the reducing agent passage outlet 40b are sealed, and then the oxidizing agent passage inlet 30a and the reducing agent passage inlet 40a are sealed. The oxygen concentration is detected by a known oxygen concentration meter (not shown). In this manner, the oxygen concentration within the oxidizing agent passage 30 and within the reducing agent passage 40 is decreased to 1% or less. To be specific, a gas analyzer (e.g., portable gas analyzer PG-200 manufactured by HORIBA Co. Ltd) is coupled to the oxidizing agent passage outlet 30b and the reducing agent passage outlet 40b to measure the oxygen concentration of the gas inside the stack 200. When it is detected that the oxygen concentration is 1% or less, the inlet 30a and the outlet 30b of the oxidizing agent passage 30 and the inlet 40a and the outlet 40b of the reducing agent passage 40 are sealed. In this step, as shown in FIG. 1, squeezed packings 80 such as O-rings attached to the sealing plugs 60 seal gaps between the sealing plugs 60 and the oxidizing agent passage outlet 30b, the reducing agent passage outlet 40b, the oxidizing agent passage inlet 30a and the reducing agent passage inlet 40a. It is desirable to make the oxygen concentration as low as possible, because an alcohol oxide is less likely to be generated. In the present invention, the effects were confirmed using nitrogen of 99.999% purity. Therefore, a lower limit value of the oxygen concentration is 10 ppm. It may be assumed that the effects are maintained using a gas with higher purity, but such a gas is difficult to obtain and is not practical for use in the preservation method, considering gas cost.

Hereinafter, specific examples of the first embodiment will be specifically described, but the present invention is not intended to be limited to the examples below.

Example 1-1

The preservation assembly 300 of the PEFC stack 200 of the example 1-1 was created as follows. In the PEFC stack 200, 50 of cells 100 were stacked and the cathode separators 15 and the anode separators 20 were each constructed of an isotropic graphite plate having a thickness of 3 mm. A plurality of manifold holes were formed at peripheral regions of main surfaces of the cathode separator 15 and the anode separator 20, and these manifold holes were coupled to form the oxidizing agent passage 30, the reducing agent passage 40, and the coolant gas passage 45 when the cells 100 are stacked.

The MEA 10 included in the cell 100 was manufactured as follows. The oxidizing agent side electrode catalyst layer 2 was formed by catalyst powder comprised of acetylene black based carbon powder (Denka Black FX-35 produced by Denki Kagaku Co. Ltd) carrying 25 wt % platinum particles with an average particle diameter of about 30 angstrom thereon. The reducing agent side electrode catalyst layer 3 was formed by catalyst powder comprised of acetylene black based carbon powder (Denka Black FX-35 produced by Denki Kagaku Co. Ltd) carrying 25 wt % platinum-ruthenium alloy particles (Pt:Ru=1:1 in weight ratio) with an average particle diameter of about 30 angstrom thereon. These catalyst powders were dispersed in isopropanol and were mixed with an ethyl alcohol dispersion (Flemion FSS-1 produced by Asahi Glass Co. Ltd) of perfluorocarbonsulfonic acid powder and the resulting mixture was produced into pastes. These pastes were applied to one main surfaces of carbon unwoven clothes (TGP-H-090 manufactured by TORAY Co., LTD) having a thickness of 250 μm by screen printing, thereby forming the oxidizing agent side electrode catalyst layer 2 and the reducing agent side electrode catalyst layer 3. The electrode catalyst layers 2 and 3 contain catalyst metal of 0.3 mg/cm$^2$ and perfluorocarbonsulfonic acid of 1.2 mg/cm$^2$.

As the polymer electrolyte membrane 1, a perfluorocarbonsulfonic acid membrane (Nafion 112 manufactured by U.S. Dupont Co. Ltd) with a thickness of 50 μm was used.

The oxidizing agent side electrode catalyst layer 2 and the reducing agent side electrode catalyst layer 3 were joined to main surfaces of both sides of the center section of the polymer electrolyte membrane 1 by hot pressing. Fluorine rubber sheets having a thickness of 250 μm were cut out to form a pair of gaskets. The gaskets sandwiched the polymer electrolyte membrane 1 so that the oxidizing agent side electrode catalyst layer 2 and the reducing agent side electrode catalyst layer 3 were exposed, and were joined to the polymer electrolyte membrane 1 by hot pressing (condition of 135° C., 1 Mpa, and 10 minutes).

As the replacement gas, 99.999% nitrogen was used.

The nitrogen was supplied from the oxidizing agent passage inlet 30a at a flow rate of 1 L/min, and when the oxygen concentration P of the nitrogen exhausted from the oxidizing agent passage outlet 30b became 0.08%, the oxidizing agent passage outlet 30b and the oxidizing agent passage inlet 30a were sequentially sealed.

The nitrogen was supplied from the reducing agent passage inlet 40a at a flow rate of 1 L/min, and when the oxygen concentration P of the nitrogen exhausted from the reducing agent passage outlet 40b became 0.08%, the reducing agent passage outlet 40b and the reducing agent passage inlet 40a were sequentially sealed.

The preservation assembly 300 of the PEFC stack 200 of the example 1-1 was preserved in atmosphere at a temperature of 20° C. and a relative humidity of 30% for 3 months. In this example, the preservation assembly 300 was preserved in a room under the condition in which the temperature and humidity were controlled by air conditioning.

After preservation, the PEFC stack 200 was kept at 75° C. The reducing agent (80% hydrogen/20% carbon dioxide/10 ppm carbon monoxide) humidified to have a dew point of 75°

C. was temperature-increased up to 75° C. and was supplied to the reducing agent passage 40. The air humidified to have a dew point of 75° C. temperature-increased up to 75° C. was supplied to the oxidizing agent passage 30. Under this condition, a rated power operation of the PEFC stack 200 was carried out.

The rated power operation of the PEFC stack 200 was carried out under the condition in which a fuel utilization ratio was 80%, an oxygen utilization ratio was 30%, and a current density was 0.3 A/cm$^2$.

Example 1-2

The preservation assembly 300 of the PEFC stack 200 was created as follows. The PEFC stack 200 and the replacement gas (nitrogen) which were identical to those of the example 1-1 were used. The nitrogen was supplied from the oxidizing agent passage inlet 30a at a flow rate which was equal to that of the example 1-1, and when a oxygen concentration P of the nitrogen exhausted from the oxidizing agent passage outlet 30b became 0.11%, the oxidizing agent passage outlet 30b and the oxidizing agent passage inlet 30a were sequentially sealed.

The nitrogen was supplied from the reducing agent passage inlet 40a at a flow rate which was equal to that of the example 1-1, and when the oxygen concentration P of the nitrogen exhausted from the reducing agent passage outlet 40b became 0.11%, the reducing agent passage outlet 40b and the reducing agent passage inlet 40a were sequentially sealed.

Thereafter, under the condition identical to that of the example 1-1, the preservation assembly 300 of the PEFC stack 200 was preserved for 3 months, and then the rated power operation of the PEFC stack 200 was carried out.

[Performance Evaluation 1 Based on Rated Power Operation]

Figure 5:
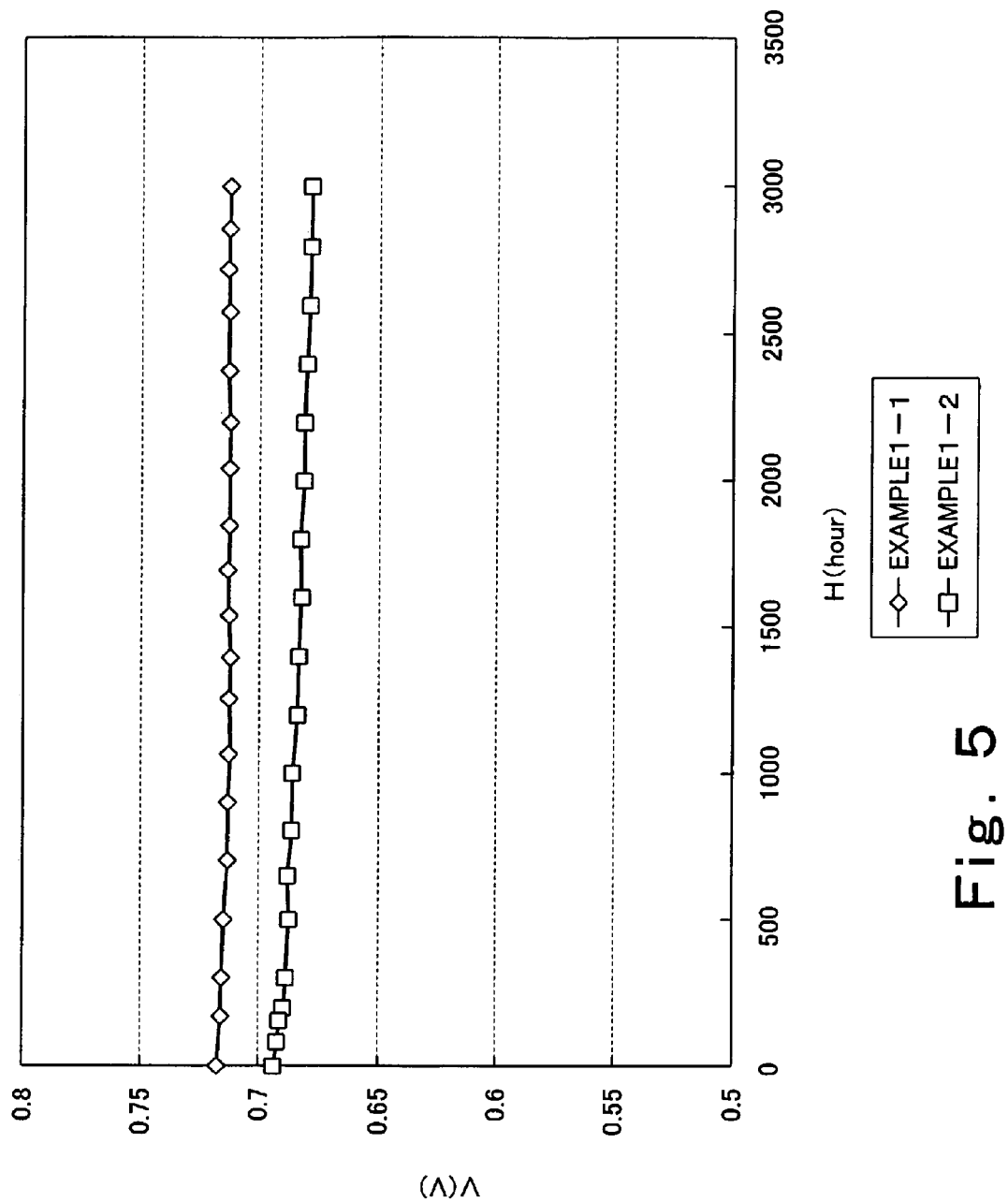
FIG. 5 is a view showing time-lapse variations in average cell voltages of PEFC stacks of an example 1-1 and an example 1-2 in a rated power operation.

FIG. 5 is a view showing time-lapse variations in average cell voltages in the rated power operation of the PEFC stacks 200 of the example 1-1 and the example 1-2. A voltage drop rate R of an average cell voltage V in the rated power operation of the PEFC stack 200 of the example 1-2 was, as shown in FIG. 5, 4.6 µV/h, while the voltage drop rate R of the average cell voltage V in the rated power operation of the PEFC stack 200 of the example 1-1 was 1.2 µV/h, and thus degradation of the performance of the PEFC stack 200 was further controlled.

The average cell voltage V of the PEFC stack 200 was higher in the example 1-1 than in the example 1-2.

Figure 6:
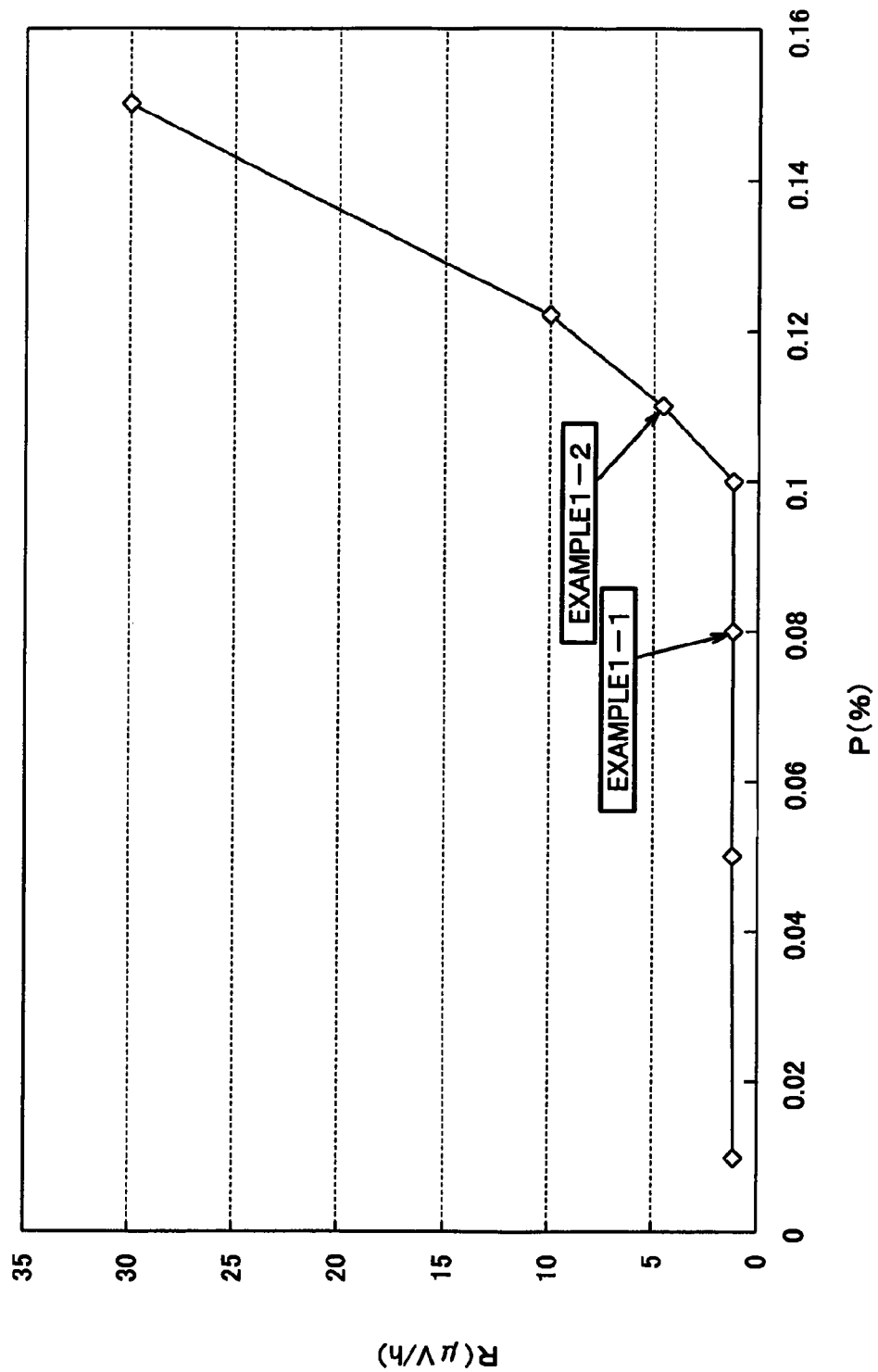
FIG. 6 is a view showing a variation in a voltage drop rate of an average cell voltage in the rated power operation of the PEFC stack under the same condition as that of the example 1-1 or the example 1-2 using an oxygen concentration of an oxidizing agent passage as a parameter.

FIG. 6 is a view showing a variation in a voltage drop rate of an average cell voltage of the PEFC stack 200 under the same condition as that of the example 1-1 or the example 1-2 using an oxygen concentration of the oxidizing agent passage 30 as a parameter. As shown in FIG. 6, when the oxygen concentration P was lower, the voltage drop rate R of the average cell voltage V was lower.

It was found that when the oxygen concentration P was 1% 0.1% (1×10$^3$ ppm) or less, the voltage drop rate R of the average cell voltage V was stabilized and became 2 µV/h or less. Considering a lower limit value and an upper limit of the oxygen concentration based on the cost of the above mentioned high-purity replacement gas, the oxygen concentration within the oxidizing agent passage 30 and within the reducing agent passage 40 of the preservation assembly 300 is suitably as low as not less than 10 ppm and not more than 1×10$^3$ ppm.

Example 1-3

As a PEFC stack of the example 1-3, the PEFC stack 200 which was identical to that of the example 1-1 was used.

The preservation assembly 300 of the PEFC stack 200 of the example 1-3 was created as follows. The nitrogen was supplied from the oxidizing agent passage inlet 30a at a flow rate which is equal to that of the example 1-1, and when the oxygen concentration P of the nitrogen exhausted from the oxidizing agent passage outlet 30b became 0.8%, the oxidizing agent passage outlet 30b and the oxidizing agent passage inlet 30a were sequentially sealed. The nitrogen was supplied from the reducing agent passage inlet 40a at a flow rate which was equal to that of the example 1-1, and when the oxygen concentration P of the nitrogen exhausted from the reducing agent passage inlet 40b became 0.8%, the reducing agent passage outlet 40b and the reducing agent passage inlet 40a were sequentially sealed.

Under the condition identical to that of the example 1-1, the preservation assembly 300 of the PEFC stack was preserved for 2 weeks, and then, the rated power operation of the PEFC stack 200 was carried out.

Example 1-4

As a PEFC stack of the example 1-4, the PEFC stack 200 identical to that of the example 1-1 was used.

The preservation assembly 300 of the PEFC stack 200 of the example 1-4 was created as follows. The nitrogen was supplied from the oxidizing agent passage inlet 30a at a flow rate which was equal to that of the example 1-1, and when the oxygen concentration P of the nitrogen exhausted from the oxidizing agent passage outlet 30b became 1.1%, the oxidizing agent passage outlet 30b and the oxidizing agent passage inlet 30a were sequentially sealed. The nitrogen was supplied from the reducing agent passage inlet 40a at a flow rate which was equal to that of the example 1-1, and when the oxygen concentration P of the nitrogen exhausted from the reducing agent passage outlet 40b became 1.1%, the reducing agent passage outlet 40b and the reducing agent passage inlet 40a were sequentially sealed.

Under the condition identical to that of the example 1-1, the preservation assembly 300 of the PEFC stack 200 was preserved for 2 weeks, and then the rated power operation of the PEFC stack 200 was carried out.

[Performance Evaluation 2 Based on Rated Power Operation]

The average cell voltage V in the rated power operation of the PEFC stack 200 of the example 1-4 was 7 mV lower than that before preservation, and thus, degradation of the performance of the PEFC stack 200 was controlled, while the average cell voltage V in the rated power operation of the PEFC stack 200 of the example 1-3 was 2 µV lower than that before preservation, and thus, degradation of the performance of the PEFC stack 200 was further controlled.

It was found that when the preservation assembly 300 of the PEFC stack 200 was preserved for less than 2 weeks, the voltage drop was noticeably controlled effectively when the concentration P was 1% (1×10$^4$ ppm) or less.

Example 1-5

The preservation assembly 300 of the PEFC stack 200 of the example 1-5 was created as follows.

As a PEFC stack of the example 1-5, the PEFC stack 200 identical to that of the example 1-1 was used.

The nitrogen was supplied from the oxidizing agent passage inlet 30a at a flow rate which was equal to that of the example 1-1, and when the oxygen concentration P of the nitrogen exhausted from the oxidizing agent passage outlet 30b became 0.08%, the oxidizing agent passage outlet 30b and the oxidizing agent passage inlet 30a were sequentially sealed.

The nitrogen was supplied from the reducing agent passage inlet 40a at a flow rate which was equal to that of the example 1-1, and when the oxygen concentration P of the nitrogen exhausted from the reducing agent passage inlet 40b became 0.08%, the reducing agent passage outlet 40b and the reducing agent passage inlet 40a were sequentially sealed.

The preservation assembly 300 of the PEFC stack was preserved at a temperature of 55° C. and a relative humidity of 30% for 3 months. In this example, the preservation assembly 300 was preserved in a room under the condition in which the temperature and humidity were controlled by air conditioning.

After preservation, the rated power operation was carried out using the PEFC stack 200 under the condition identical to that of the example 1-1.

Example 1-6

The preservation assembly 300 of the PEFC stack 200 was created as follows.

As a PEFC stack of the example 1-6, the PEFC stack 200 identical to that of the example 1-1 was used.

The nitrogen was supplied from the oxidizing agent passage inlet 30a at a flow rate which was equal to that of the example 1-1, and when the oxygen concentration P of the nitrogen exhausted from the oxidizing agent passage outlet 30b became 0.08%, the oxidizing agent passage outlet 30b and the oxidizing agent passage inlet 30a were sequentially sealed.

The nitrogen was supplied from the reducing agent passage inlet 40a at a flow rate which was equal to that of the example 1-1, and when the oxygen concentration P of the nitrogen exhausted from the reducing agent passage outlet 40b became 0.08%, the reducing agent passage outlet 40b and the reducing agent passage inlet 40a were sequentially sealed.

The preservation assembly 300 of the PEFC stack 200 was preserved in atmosphere at a temperature of 65° C. and a relative humidity of 30% for 3 months. In this example, the preservation assembly 300 was preserved in a room under the condition in which the temperature and humidity were controlled by air conditioning.

After preservation, the rated power operation was carried out using the PEFC stack 200 under the condition identical to that of the example 1-1.

[Performance Evaluation 3 Based on Rated Power Operation]

Figure 7:
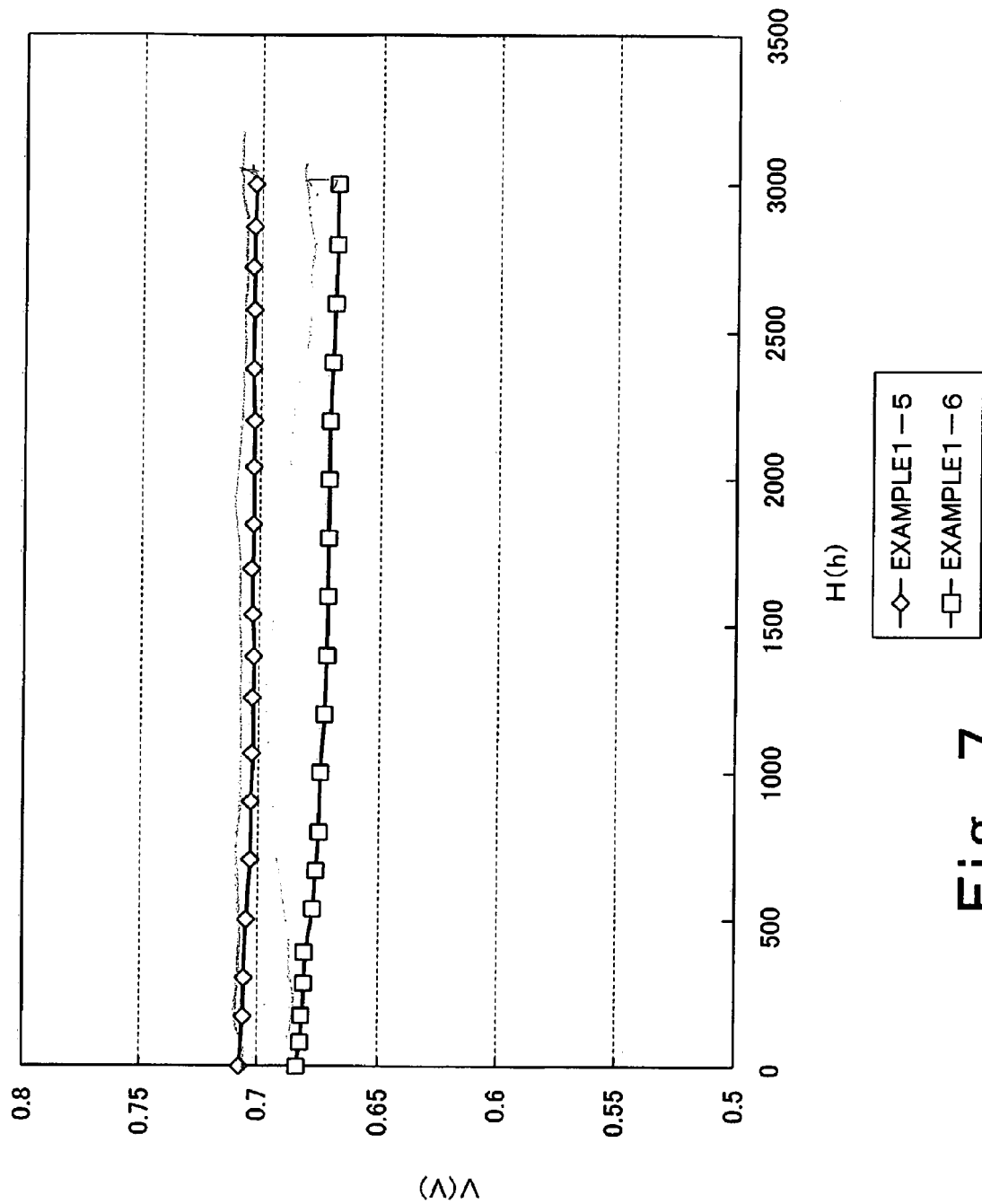
FIG. 7 is time-lapse variations in average cell voltages in the rated power operation of PEFC stacks of an example 1-5 and an example 1-6.

FIG. 7 is a view showing time-lapse variations in average cell voltages in the rated power operation of PEFC stacks 200 of an example 1-5 and an example 1-6. The voltage drop rate R of the average cell voltage V in the rated power operation of the PEFC stack 200 of the example 1-6 was 5.4 μV/h, and thus degradation of performance of the PEFC stack 200 was controlled, while the voltage drop rate R of the average cell voltage V in the rated power operation of the PEFC stack 200 of the example 1-5 was 1.4 μV/h, and thus degradation of the performance of the PEFC stack 200 was further controlled. This may be due to the fact that, in the example 1-5, since the preservation assembly 300 of the PEFC stack 200 was maintained at a temperature of 60° C. or lower, i.e., lower than an activation temperature of the platinum catalyst, influence of an oxidization reaction of alcohol on the degradation of the performance of the PEFC stack 200 was reduced.

The average cell voltage V of the PEFC stack 200 was higher in the example 1-5 than in the example 1-6. This may be due to the fact that, in the example 1-5, influence of poisoning resulting from oxidization of the solvent remaining in the oxidizing agent side electrode catalyst layer 2 and the reducing agent side electrode catalyst layer 3 was sufficiently controlled during a preservation period (3 months), and thus, the degradation of the cell performance was sufficiently controlled.

Figure 8:
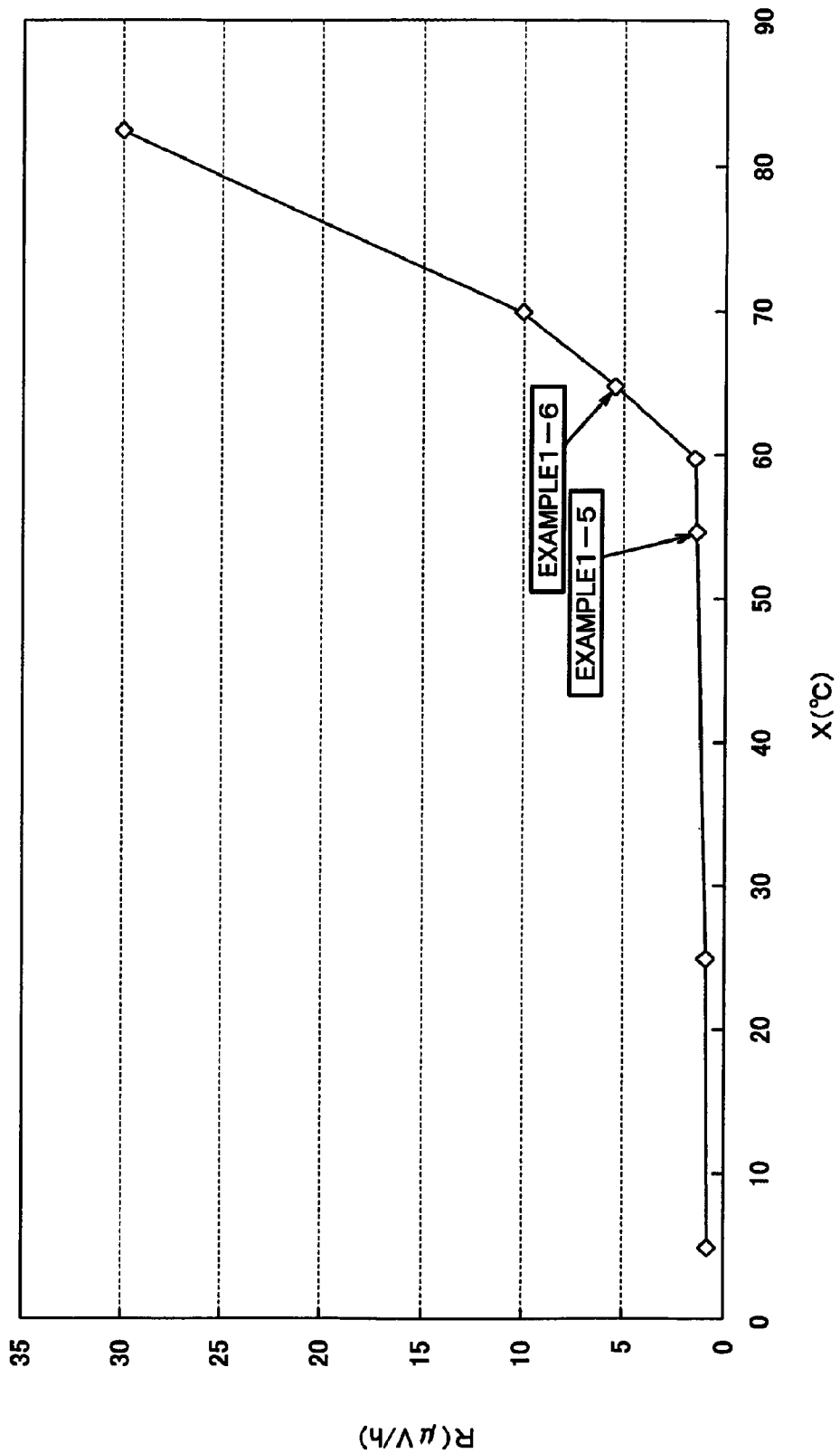
FIG. 8 is a view showing a variation in a voltage drop rate of average cell voltages in the rated power operation of the PEFC stack under the same condition as that of the example 1-5 or the example 1-6 using temperature during preservation of the preservation assembly of the PEFC stack as a parameter.

FIG. 8 is a view showing a variation in an average cell voltage of the PEFC stack 200 under the same condition as that of the example 1-5 or the example 1-6 using preservation temperature of the preservation assembly 300 of the PEFC stack 200 as a parameter. As shown in FIG. 8, when preservation temperature X was lower, the voltage drop rate R of the average cell voltage V was lower. In particular, when the preservation temperature X was 60° C. or lower, the voltage drop rate R of the average cell voltage V was stabilized and was 2 μV/h or less.

The preservation temperature X is suitably 25° C. or lower. This is because a partial oxidization reaction and dehydration and condensation reaction of an organic solvent component remaining in the oxidizing agent passage and the reducing agent passage, which may be caused by oxygen remaining in the oxidizing agent passage and the reducing agent passage, (including a reaction between organic solvent components, a reaction between partial oxidization products, and a reaction between the organic solvent component and the partial oxidization product) are reliably inhibited. Also, when the preservation temperature X is higher than 0° C., mechanical damage to the MEA 10 under low temperature conditions is easily and sufficiently inhibited. Therefore, the preservation assembly 300 of the PEFC stack 200 is desirably preserved at a temperature higher than 0° C. and not higher than 25° C.

Embodiment 2

In a second embodiment of the present invention, water is filled in the oxidizing agent passage 30 and the reducing agent passage 40 instead of the replacement gas.

A preservation assembly 310 of the PEFC stack 200 of the second embodiment is constructed such that the oxidizing agent passage 30 and the reducing agent passage 40 of the PEFC stack 200 are filled with water and the inlet 30a and the outlet 30b of the oxidizing agent passage 30 and the inlet 40a and the outlet 40b of the reducing agent passage 40 are respectively sealed by the sealing plugs 60. In this embodiment, as the water, distilled water is used.

In the preservation method of the PEFC stack 310 of the second embodiment of the present invention, in step S1 of FIG. 4, the water is filled in the oxidizing agent passage 30 and the reducing agent passage 40 of the PEFC stack 200. In the second embodiment, the distilled water is supplied from the oxidizing agent passage inlet 30a and the reducing agent passage inlet 40a of the PEFC stack 200. In step S2 of FIG. 4, the inlet 30a and the outlet 30b of the oxidizing agent passage 30 and the inlet 40a and the outlet 40b of the reducing agent passage 40 are respectively sealed by the sealing units 60. In this step, the oxidizing agent passage outlet 30b and the reducing agent passage outlet 40b are sealed, and when the distilled water has been filled in the oxidizing agent passage 30 and the reducing agent passage 40, the oxidizing agent passage inlet 30a and the reducing agent passage inlet 40a are sealed. By filling the water in the oxidizing agent passage 30 and the reducing agent passage 40 in this manner, the oxygen concentration within the oxygen agent passage 30 and the reducing agent passage 40 can be easily maintained to be less than the oxygen concentration in atmospheric air. By doing so, in addition, since a water-soluble component of the organic solvent component remaining in the catalyst layer is dissolved outside the catalyst layer and thereby is diluted, the partial oxidization reaction and dehydration and condensation reaction of the water-soluble component in the catalyst layer (including a reaction between water-soluble components, a reaction between partial oxidation products, and a reaction between the water-soluble solvent component and the partial oxidation product), etc are sufficiently inhibited. As a result, the effects of the present invention are reliably obtained.

Hereinbelow, specific examples of the second embodiment will be described. It should be understood that the present invention is not intended to be limited to the examples below.

Example 2

The preservation assembly 310 of the PEFC stack 200 was created as follows.

As a PEFC stack of the example 2, the PEFC stack 200 identical to that of the example 1-1 was used. The distilled water was supplied to the oxidizing agent passage 30 and the reducing agent passage 40. When the oxidizing agent passage outlet 30b and the reducing agent passage outlet 40b were sealed and the distilled water was filled in the oxidizing agent passage 30 and the reducing agent passage 40, the oxidizing agent passage inlet 30a and the reducing agent passage inlet 40a were sealed. In this manner, atmospheric air was purged from the interior of the oxidizing agent passage 30 and from the interior of the reducing agent passage 40 and the distilled water was filled therein.

Under the same condition as that of the example 1-1, the preservation assembly 300 of the PEFC stack 200 was preserved for 3 months, and then the rated power operation of the PEFC stack 200 was carried out.

[Performance Evaluation 4 Based on Rated Power Operation]

Figure 9:
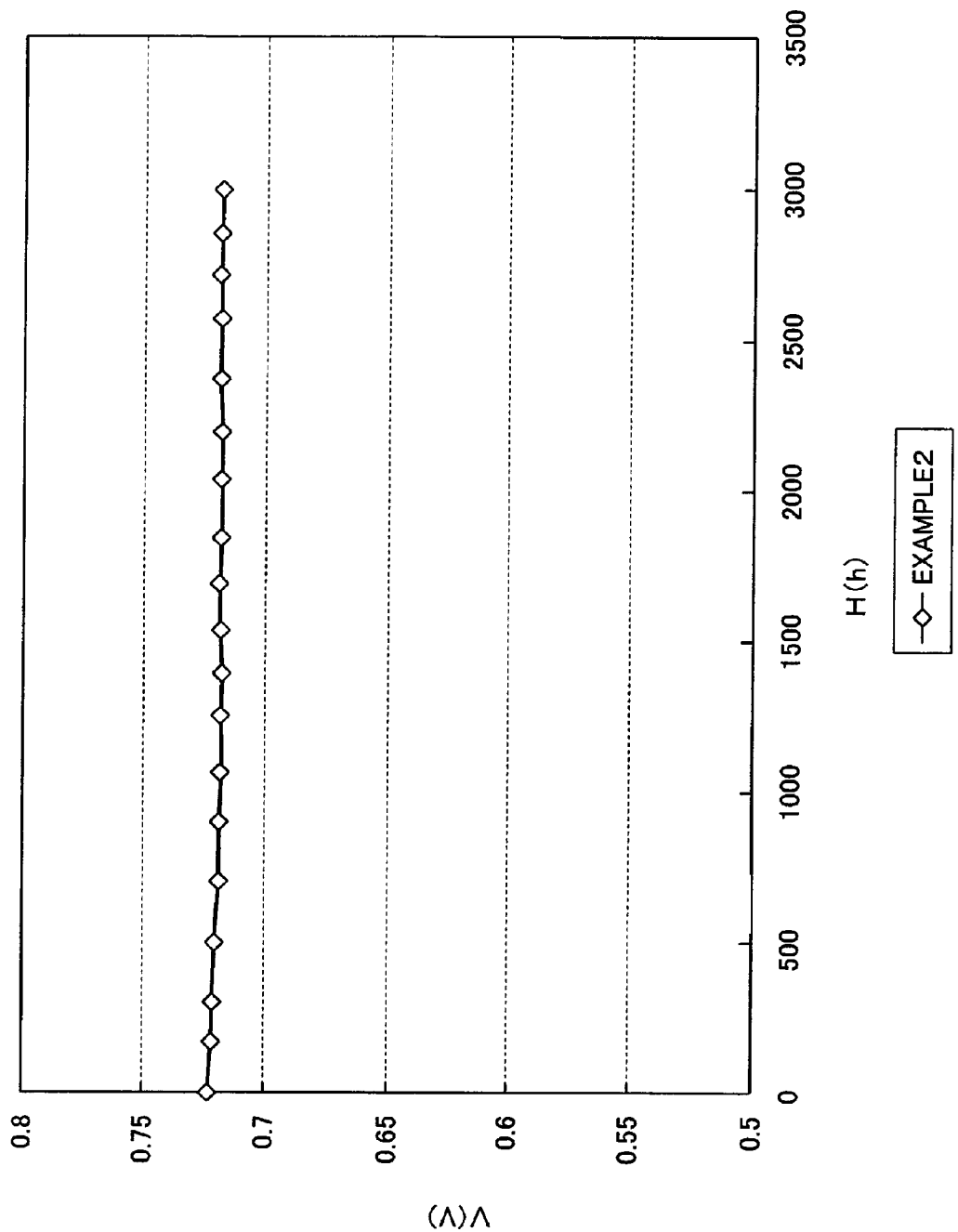
FIG. 9 is a view showing a time-lapse variation in an average cell voltage in a rated power operation of a PEFC stack according to an example 2.

FIG. 9 is a view showing a time-lapse variation in an average cell voltage in the rated power operation of the PEFC stack 200 according to the example 2. The voltage drop rate R of the average cell voltage V in the rated power operation of the PEFC stack 200 of the example 2 was 1.3 μV/h and, thus, degradation of performance of the PEFC stack 200 was controlled as compared to the example 1-1 in which the voltage drop rate R was 4.6 μV/h. This may be due to the fact that, since deficiency of oxygen occurs because of the water filled within the oxidizing agent passage 30 and within the reducing agent passage 40, and thereby, the poisoning resulting from oxidization of the solvent remaining in the oxidizing agent side electrode catalyst layer 2 and the reducing agent side electrode catalyst layer 3 was controlled, deactivation of these electrode catalyst layers was little during power generation.

Embodiment 3

Figure 10:
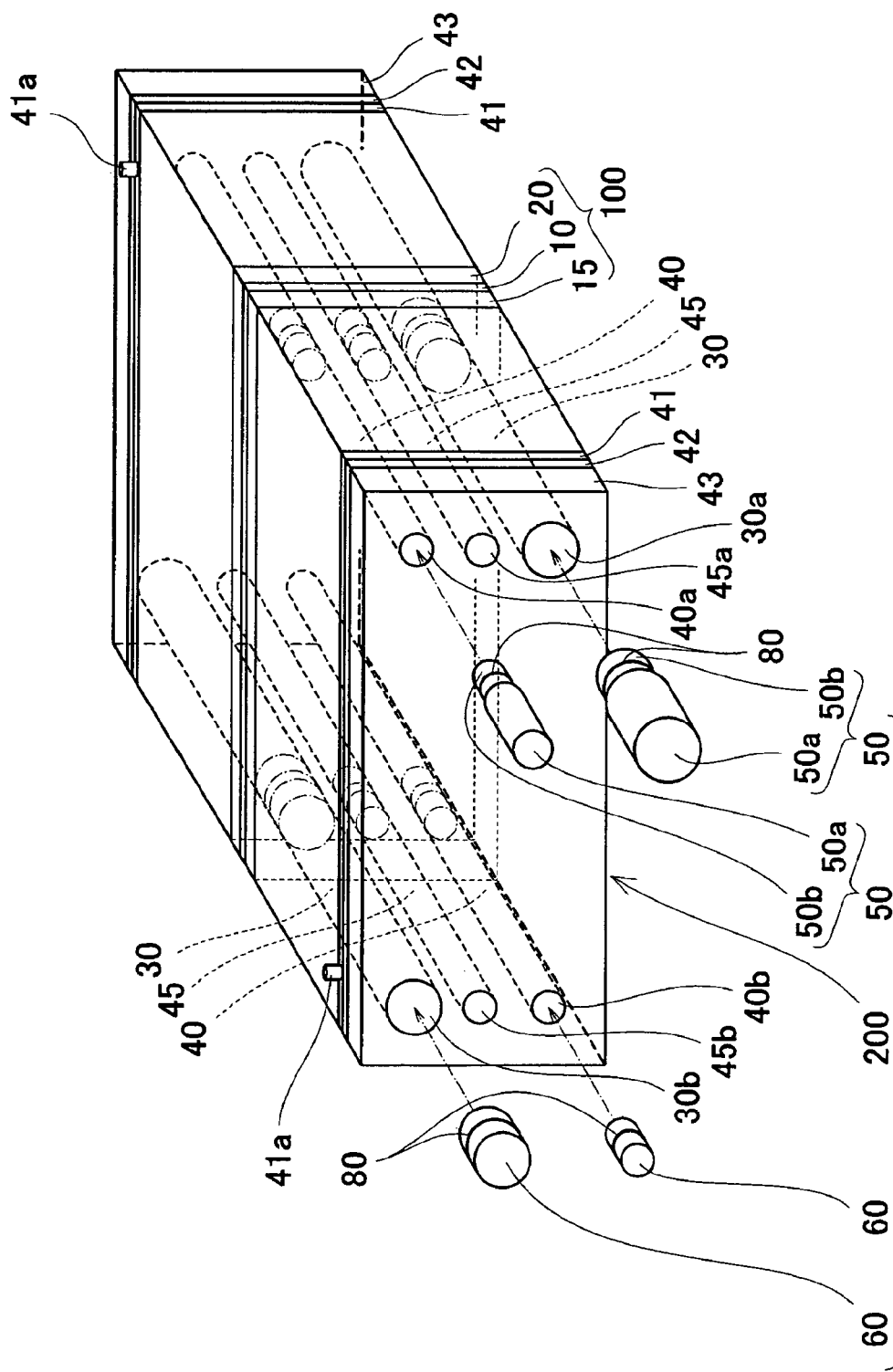
FIG. 10 is a schematic view of a preservation assembly of a PEFC stack according to a third embodiment of the present invention.

FIG. 10 is a schematic view of a preservation assembly 320 of the PEFC stack 200 according to a third embodiment of the present invention.

As shown in FIG. 10, in the third embodiment of the present invention, oxygen removing agent containers 50 are attached to the oxidizing agent passage inlet 30a or the oxidizing agent passage outlet 30b and the reducing agent passage inlet 40a or the reducing agent passage outlet 40b to seal them, instead of the sealing plugs 60. Specifically, in the preservation assembly 320 of the PEFC stack 200 of the third embodiment, the sealing units are constructed of the sealing plugs 60 and the oxygen removing agent containers 50. The preservation method of the PEFC stack 200 of the third embodiment is identical to that of the first embodiment in FIG. 4.

Since the preservation assembly 320 and the preservation method of the PEFC stack 200 of the third embodiment are identical to those of the first embodiment except for the oxygen removing agent containers 50, the same reference numerals as those in FIG. 1 denote the same or corresponding parts in FIG. 10, and only the oxygen removing agent containers 50 will be described. Also, the preservation method of the PEFC stack 200 of the third embodiment will not be further described.

Each oxygen removing agent container 50 includes a base portion 50a and a connecting portion 50b provided on the base portion 50a. Each connecting portion 50b is easily removably attachable to the oxidizing agent passage inlet 30a and to the reducing agent passage inlet 40a to seal them. For example, as shown in FIG. 10, the squeezed packings 80 are attached to the connecting portions 50b to seal gaps between the connecting portions 50b, and the oxidizing agent passage inlet 30a and the reducing agent passage inlet 40a. Each base portion 50a contains an oxygen removing agent. Exemplary oxygen removing agent may include "ageless" produced by MITSUBISHI GAS CHEMICAL COMPANY. INC, "PR system" produced by MITSUBISHI GAS CHEMICAL COMPANY. INC, "sequl" produced by NISSO JUSHI Co., LTD, iron based removing agent, magnesium based removing agent, organic removing agent, alkaline earth based removing agent, etc. The oxygen removing agent containers 50 can continuously remove oxygen from the interior of the oxidizing agent passage 30 and from the interior of the reducing agent passage 40. As a result, the oxygen concentration P within the oxidizing agent passage 30 and within the reducing agent passage 40 can be maintained to be low for a long time period.

Embodiment 4

Figure 11:
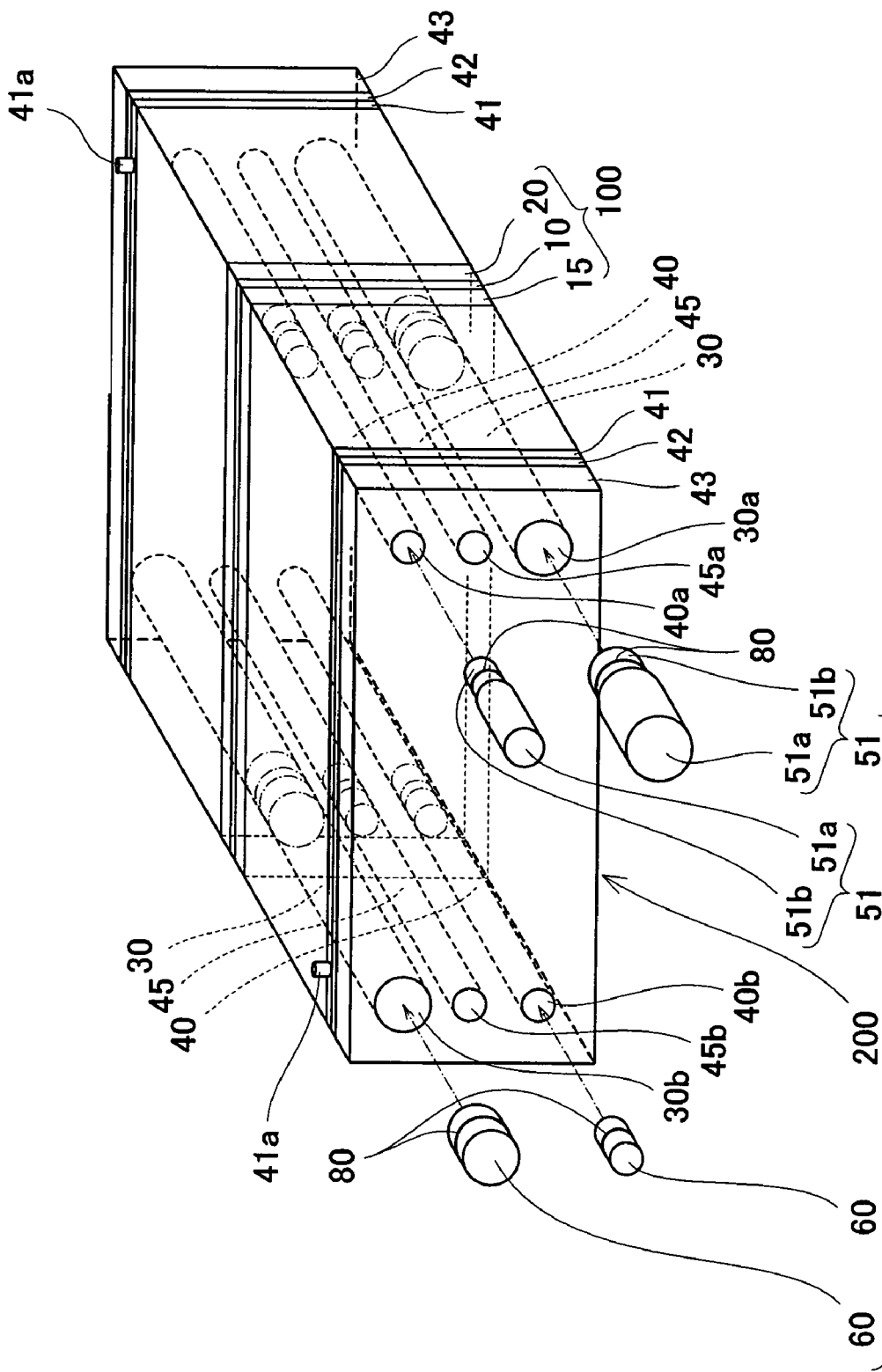
FIG. 11 is a schematic view of a preservation assembly of a PEFC stack according to a fourth embodiment of the present invention.

FIG. 11 is a schematic view of a preservation assembly 330 of the PEFC stack 200 according to a fourth embodiment of the present invention. As shown in FIG. 11, in the fourth embodiment of the present invention, replacement gas containers 51 are attached to the oxidizing agent passage inlet 30a or the oxidizing agent passage outlet 30b and the reducing agent passage inlet 40a or the reducing agent passage outlet 40b to seal them, instead of the sealing plugs 60. In the preservation assembly 330 of the PEFC stack 200 of this embodiment, the sealing units are constructed of the sealing plugs 60 and the replacement gas containers 51. The preservation method of the PEFC stack 200 of the fourth embodiment is identical to that of the first embodiment in FIG. 4.

Since the preservation assembly 330 and the preservation method of the PEFC stack 200 of the fourth embodiment are identical to those of the first embodiment except for the replacement gas containers 51, the same reference numerals as those in FIG. 1 denote the same or corresponding parts in FIG. 11, and only the replacement gas contains 51 will be described. Also, the preservation method of the PEFC stack 200 of the fourth embodiment will not be further described.

Figure 12:
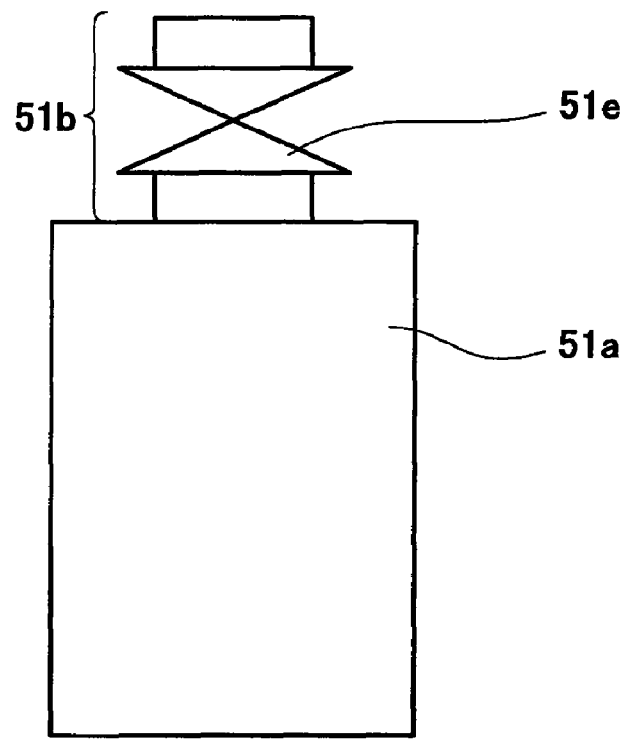
FIG. 12 is a view schematically showing a replacement gas container.

FIG. 12 is a schematic view of the replacement gas container 51. As shown in FIG. 12, the replacement gas container 51 includes a base portion 51a constructed of a pressure-resistant tank of a hollow rectangular parallelepiped, and a connecting portion 51b of the base portion 51a which is provided with a known pressure-reducing valve 51e. As in the connecting portions 50b of the oxygen removing agent containers 50, the connecting portions 51b of the replacement gas containers 51 are easily removably attachable to the oxidizing agent passage inlet 30a and the reducing agent passage inlet 40a to seal them. The replacement gas container 51 is capable of ejecting a replacement gas substantially automatically and intermittently according to the pressure within the oxidizing agent passage 30 and within the reducing agent passage 40 by the operation of the pressure-reducing valve 51e. Since the replacement gas containers 51 inhibit pressure reduction of the replacement gas within the oxidizing agent passage 30 and within the reducing agent passage 40, entry of oxygen into the oxidizing agent passage 30 and the reducing agent passage 40 is controlled. As a result, the oxygen concentration within the oxidizing agent passage 30 and within the reducing agent passage 40 can be maintained to be low for a long time period.

Embodiment 5

Figure 13:
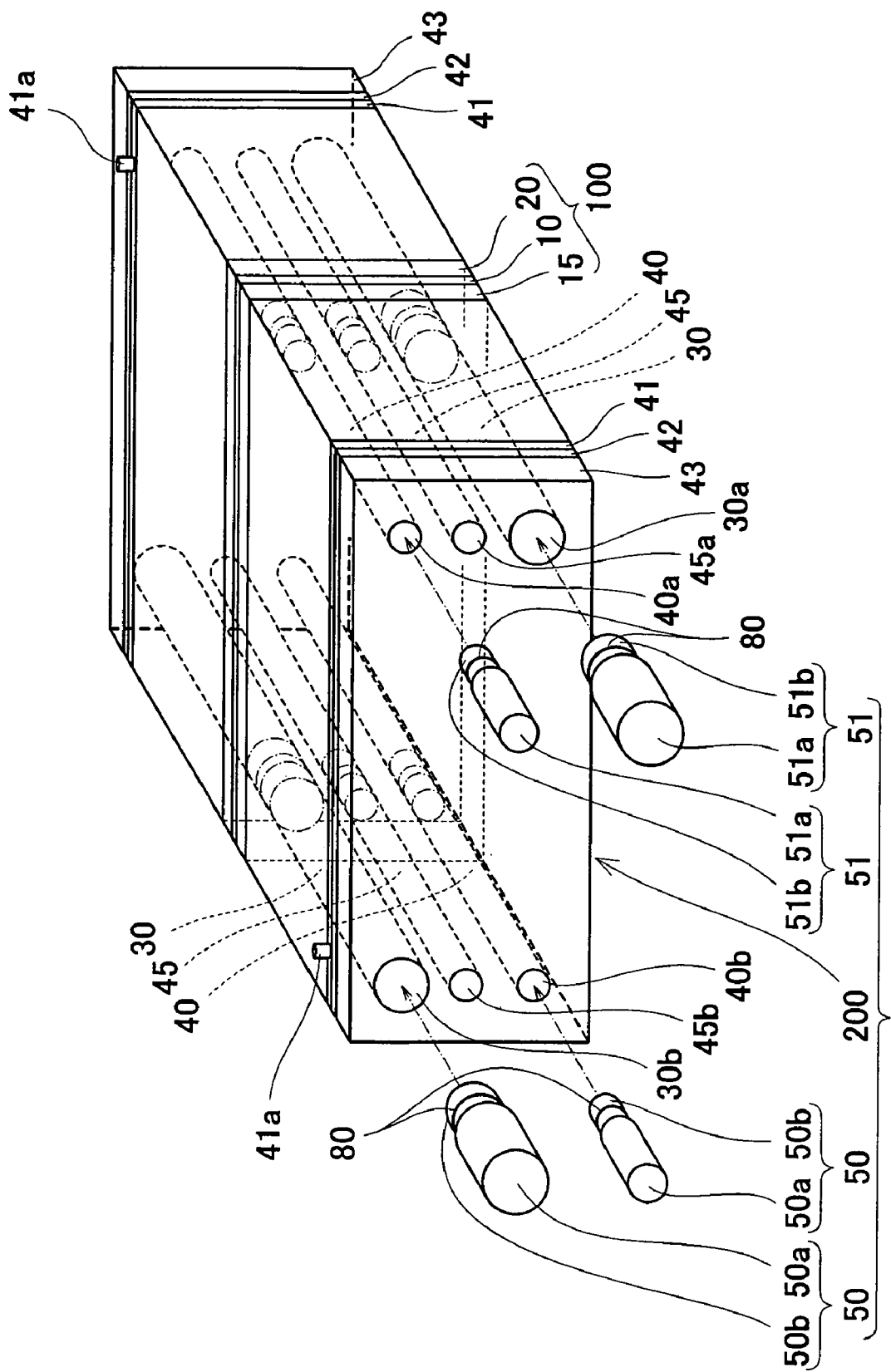
FIG. 13 is a schematic view of a preservation assembly of a PEFC stack according to a fifth embodiment of the present invention.

FIG. 13 is a schematic view of a preservation assembly 340 of the PEFC stack 200 according to a fifth embodiment of the present invention.

As shown in FIG. 13, in the third embodiment of the present invention, the oxygen removing agent containers 50 and the replacement gas containers 51 are attached to the oxidizing agent passage inlet 30a and the oxidizing agent passage outlet 30b and to the reducing agent passage inlet 40a and the reducing agent passage outlet 40b to seal them, instead of the sealing plugs 60. In other words, in the preservation assembly 340 of the PEFC stack 200 of the fifth embodiment, the sealing units are constructed of two pairs of the oxygen removing agent containers 50 and two pairs of the replacement gas containers 51. Also, the preservation method of the PEFC stack 200 of the fifth embodiment is identical to that of the first embodiment in FIG. 4.

Since the preservation assembly 340 of the PEFC stack 200 of the fifth embodiment is a combination of the third embodiment and the fourth embodiment, the structure of the preservation assembly 340 and the preservation method of the PEFC stack 200 will not be described. In FIG. 13, the same reference numerals as those in FIGS. 1, 10 and 11 denote the same or corresponding parts, which will not be further described. Since in the preservation assembly 340 thus constructed, the oxygen removing agent containers 50 continue to remove oxygen from the interior of the oxidizing agent passage 30 and from the interior of the reducing agent passage 40, and the replacement gas containers 51 inhibit pressure reduction of the replacement gas within the oxidizing agent passage 30 and the reducing agent passage 40, entry of oxygen into the oxidizing agent passage 30 and the reducing agent passage 40 is controlled. As a result, the oxygen concentration within the oxidizing agent passage 30 and within the reducing agent passage 40 can be maintained to be low for a long time period.

Embodiment 6

A sixth embodiment of the present invention illustrates that the preservation assembly of the PEFC stack of any one of the first to fifth embodiments, i.e., the PEFC stack 200 to which sealing units are attached is packaged in a sealed state.

First of all, a preservation assembly 350 of the PEFC stack 200 of the sixth embodiment will be described.

The preservation assembly 350 of the PEFC stack 200 is packaged in a package element in a sealed state, although not shown.

When the package element is constructed of a flexible package element, the PEFC stack 200 to which the sealing units are attached is packaged in a sealed state by bonding the package element. Exemplary package element may include high-density polyethylene film, polyvinylidene chloride film, polyethylene-vinylalcohol film, or any of these films that is provided with aluminum deposited thereon or that is provided with laminated aluminum foil. These package elements may be of a sheet shape or a bag shape. The package element is bonded in such a manner that an opening of the package element is closed by thermal fusion bonding, or a clip.

An oxygen detecting agent, for example, silica gel, "ageless eye" produced by MITSUBISHI GAS CHEMICAL COMPANY. INC, etc is suitably put into the package bag along with the PEFC stack 200. This is convenient for storage of the PEFC stack 200, because the oxygen detecting agent is capable of detecting oxygen state within the package bag of the preservation assembly 350 of the PEFC stack 200. Especially when the package element is transparent, the oxygen state within the package bag is detectable from outside without opening the package bag. As a result, the preservation assembly 350 of the PEFC stack 200 can be preserved more appropriately.

When the preservation assembly 350 of the PEFC stack 200 is constructed of a rigid body container comprised of a base portion and a lid, the PEFC stack 200 to which the sealing units are attached is packaged in a sealed state by joining the base portion and the lid to each other. Exemplary rigid body container may include a rigid body container made of aluminum and duralumin. A joint portion of the base portion and the lid is sealed by a seal element. The use of the rigid body container can avoid damage to the preservation assembly 350 of the PEFC stack 200 during transportation. In addition, the container is re-usable.

After the preservation assembly 350 of the PEFC stack 200 is packaged, air is exhausted from the interior of the package element. This further reduces the possibility of the entry of the oxygen into the PEFC stack 200.

Furthermore, a package element with a low oxygen permeability is suitably used. The package element with the low oxygen permeability is desirably comprised of a film that is low in oxygen permeability amount and water permeability to an extent to which the effects of the present invention are obtained. More desirably, a package element is comprised of a film with oxygen permeability amount of 0.01 mL/(m$^2$·day·atm) or less. Exemplary package element may include a package element comprised of laminate film including K-coat (polyvinylidene chloride coating) film, a package element comprised of a laminate film including a film made of, for example, EVOH (ethylene-vinylalcohol copolymer) that is low in oxygen permeability amount, and a package element comprised of a laminate film including an aluminum foil. These package elements can inhibit damage to the polymer electrolyte membrane 1 within the PEFC stack 200 being preserved. Specifically, if humidity inside the preservation assembly 350 of the PEFC stack 200 being preserved varies, then water-containing ratio of the polymer electrolyte membrane 1 may vary, causing the polymer electrolyte membrane 1 to expand and contract, which may lead to damage to the polymer electrolyte membrane 1. Since the package element with low oxygen permeability amount is also low in water permeability, it can control humidity variation inside the stack 200 and hence damage to the polymer electrolyte membrane 1.

Next, the preservation method of the PEFC stack 200 of the sixth embodiment will be described.

Figure 14:
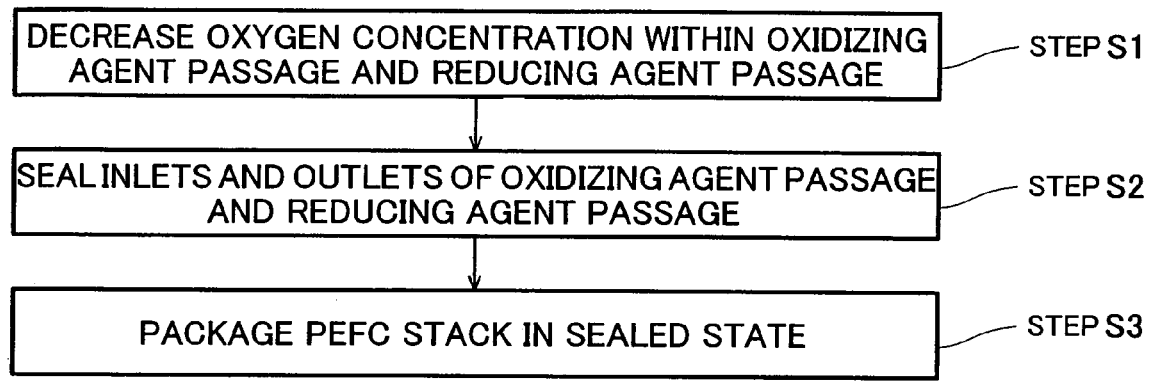
FIG. 14 is a block diagram showing a method of preserving a PEFC stack according to a sixth embodiment of the present invention.

FIG. 14 is a block diagram showing the preservation method of the PEFC stack 200 of the sixth embodiment of the present invention. As shown in FIG. 14, in the preservation method of the PEFC stack 200 of the sixth embodiment, steps S1 and S2 are performed as in the first to fifth embodiments. After step S2, in step (packaging step) S3, the PEFC stack 200 with the inlet 30a and the outlet 30b of the oxidizing agent passage 30 and the inlet 40a and the outlet 40b of the reducing agent passage 40 sealed is packaged in a sealed state in the package element.

Thus, in the sixth embodiment, it is possible to control entry of oxygen into the oxygen agent passage 30 and the reducing agent passage 40 from the vicinity of the PEFC stack 200. As a result, degradation of performance of the PEFC stack 200 can be further controlled.

Hereinbelow, specific examples of the third to sixth embodiments of the present invention will be specifically described with reference to the drawings, and the present invention is not limited to the examples below.

Example 3

In the example 3, the preservation assembly 320 of the PEFC stack 200 of the third embodiment was created as follows.

The PEFC stack 200 identical to that of the example 1 was used.

As the replacement gas, nitrogen was used.

The nitrogen was supplied from the oxygen agent passage inlet 30a and the reducing agent passage inlet 40a at 1000 cc/min for 30 min.

The sealing plugs 60 are attached to the oxidizing agent passage outlet 30b and the reducing agent passage outlet 40b and the oxygen removing agent containers 50 are attached to the oxygen agent passage inlet 30a and the reducing agent passage inlet 40a to seal them. The base portions 50a of the oxygen removing containers 50 were filled with "ageless" produced by MITSUBISHI GAS CHEMICAL COMPANY. INC.

Just after sealing, and after an elapse of 5000 hours after sealing under a room temperature (25° C.), remaining oxygen amount within the PEFC stack 200 was measured. As a result, the remaining oxygen amount was 0.1% or less just after the sealing, and increased up to approximately 6% after an elapse of 5000 hours. The remaining oxygen amount was measured at the oxygen agent passage inlet 30a, the reducing agent passage inlet 40a, the oxidizing agent passage outlet 30b and the reducing agent passage outlet 40b.

Comparison 3

In a comparison 3, the PEFC stack 200 identical to that of the example 3 was preserved in an unpackaged state without removing oxygen from the interior of the PEFC stack 200.

Example 6-1

In an example 6-1, the preservation assembly 350 of the PEFC stack 200 of the sixth embodiment and the preservation assembly 320 of the PEFC stack 200 of the example 3 were packaged in a sealed state in the package element. As the package element, "gas barrier A1 bag" produced by MITSUBISHI GAS CHEMICAL COMPANY. INC was used.

Then, just after packaging, and after an elapse of 5000 hours after packaging under a room temperature (25° C.), remaining oxygen amounts within the PEFC stacks 200 were measured as in the example 3. As a result, the remaining oxygen amounts were 0.1% or less and had substantially equal values in both cases. Here, the preservation assemblies of the PEFC stacks 200 of the example 3, the example 6-1, and the comparison 3 were preserved under a room temperature (25° C.) for 5000 hours. Thereafter, the PEFC stacks 200 were caused to perform the rated power operation under the condition in which the fuel utilization ratio was 80%, the oxygen utilization ratio was 40% and the current density was 0.3 mA/cm$^2$ in such a manner that a reducing agent humidified to have a dew point of 65° C. was temperature-increased up to 65° C. and was supplied to the reducing agent passage 40 and air humidified to have a dew point of 70° C. was temperature-increased up to 70° C. and was supplied to the oxidizing agent passage 30.

[Performance Evaluation 5 Based on Rated Power Operation]

Figure 15:
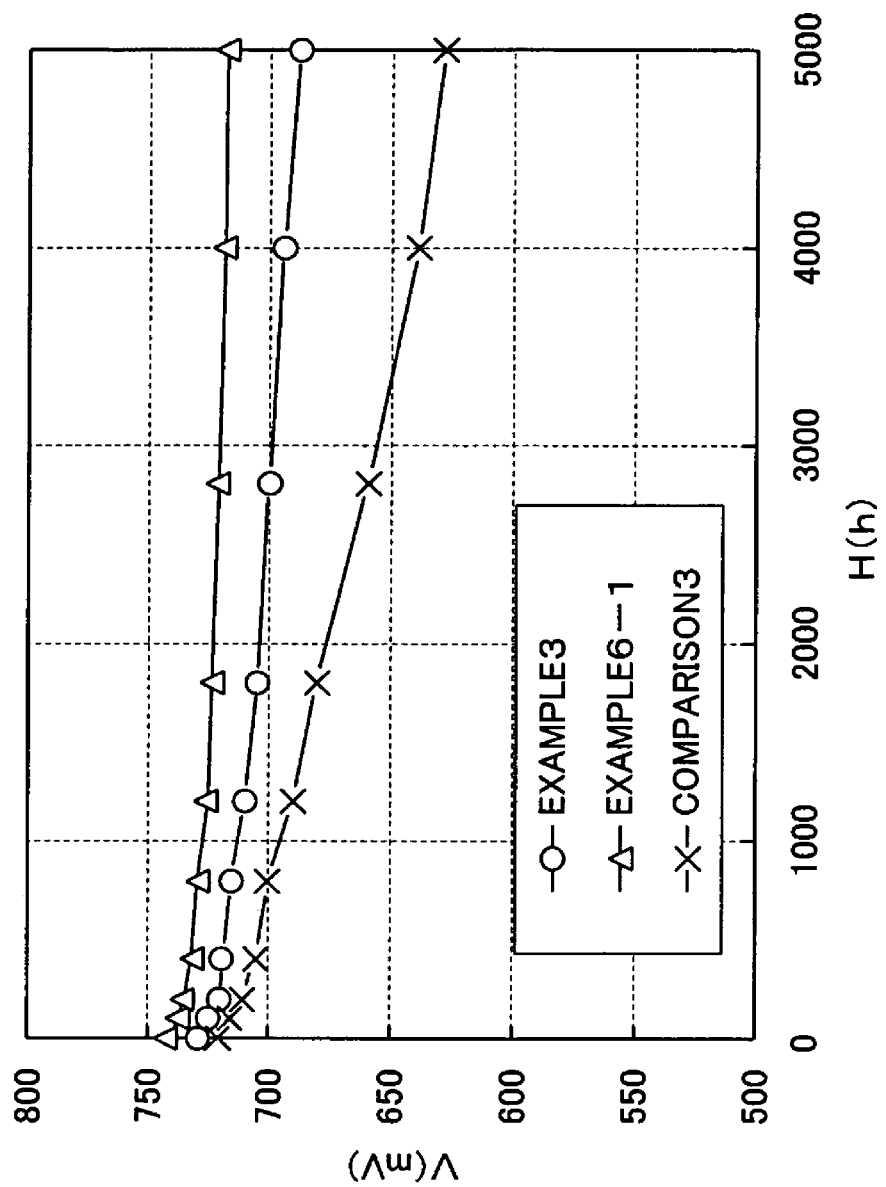
FIG. 15 is a view showing time-lapse variations in average cell voltages in the rated power operation of PEFC stacks of an example 3, an example 6-1, and a comparison 3.

FIG. 15 is a view showing time-lapse variations in average cell voltages in the rated power operation of the PEFC stacks 200 of the example 3, the example 6-1, and the comparison 3. As shown in FIG. 15, in contrast to the comparison 3, decrease of the average voltage of the respective cells was controlled after a long-time operation in the example 3. In addition, in the example 6-1, the average voltage of the respective cells was not substantially decreased. In this manner, it was confirmed that degradation of durability of the PEFC stack 200 was controlled by the preservation method of the PEFC stack 200 of the third and sixth embodiments.

Example 6-2

In an example 6-2, the preservation assembly 350 of the PEFC stack 200 of the sixth embodiment and the preservation assembly 340 of the PEFC stack 200 of the fifth embodiment were packaged in a sealed state. Specifically, using the PEFC stack 200 identical to that of the example 3, the gas within the PEFC stack 200 has been replaced by nitrogen as in the example 3. Thereafter, the oxidizing agent passage outlet 30b and the reducing agent passage outlet 40b were sealed by the oxygen removing agent containers 50, and the oxidizing agent passage inlet 30a and the reducing agent passage inlet 40a were sealed by the replacement gas containers 51.

As the replacement gas containers 51, gas tanks filled with nitrogen were used.

As in the example 3, as the oxygen removing agent containers 50, cartridges filled with "ageless" produced by MITSUBISHI GAS CHEMICAL COMPANY. INC were used.

As in the example 6-1, the preservation assembly 340 of the PEFC stack 200 was packaged in the package element.

Then, just after packaging, and after an elapse of 5000 hours after packaging, remaining oxygen amounts within the PEFC stack 200 were measured as in the example 3. As a result, the remaining oxygen amounts were 0.1% or less and had substantially equal values in both cases.

The preservation assembly 350 of the PEFC stack 200 of the example 6-2 was preserved under a room temperature (25° C.) and a high temperature (60° C.) for 5000 hours. Then, the rated power operation was carried out as in the example 3.

[Performance Evaluation 6 Based on Rated Power Operation]

Figure 16:
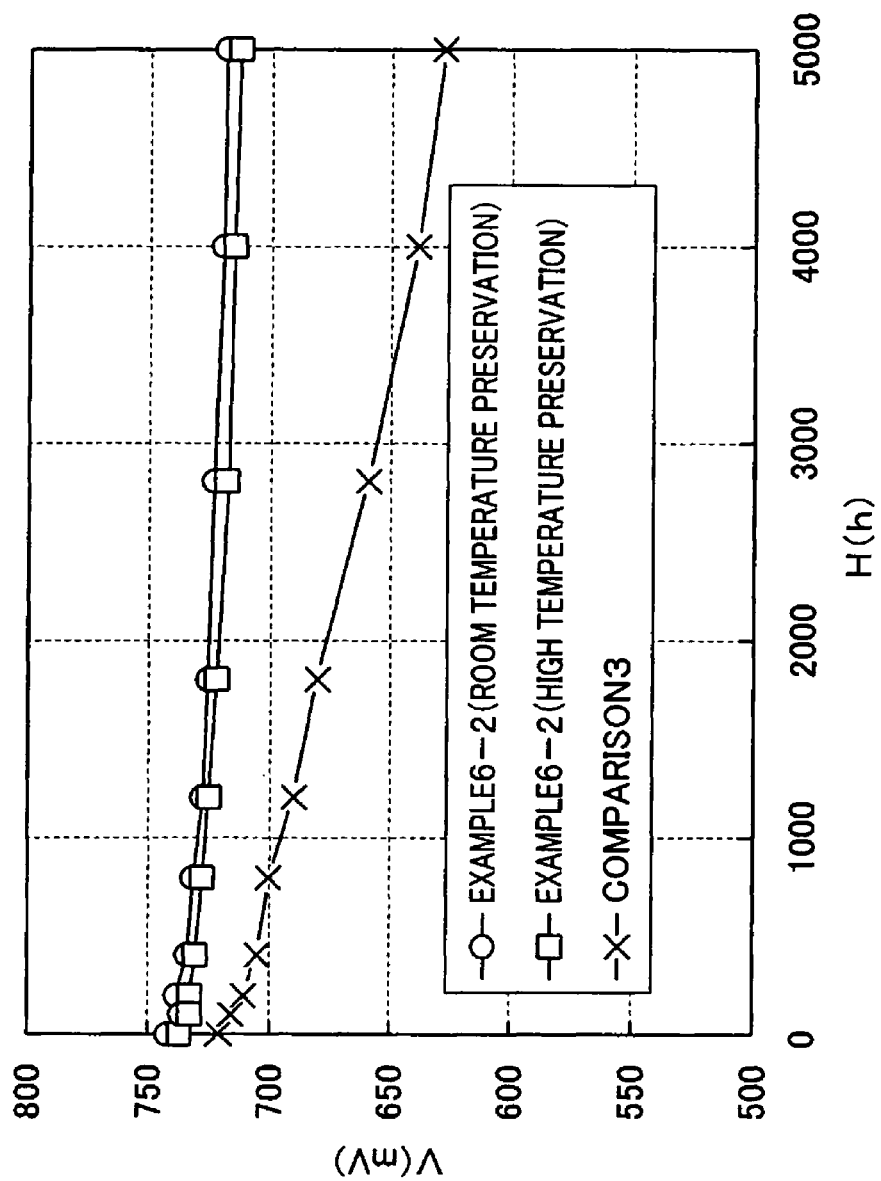
FIG. 16 is a view showing time-lapse variations in average cell voltages in the rated power operation of PEFC stacks of an example 6-2 and the comparison 3.

FIG. 16 is a view showing time-lapse variations in average cell voltages in the rated power operation of the PEFC stacks 200 of the example 6-2, and the comparison 3. As shown in FIG. 16, in the example 6-2, the average voltages of the respective cells were not substantially decreased after a long time operation. In this manner, it was confirmed that degradation of durability of the PEFC stack 200 was controlled by the preservation method of the PEFC stack 200 of the sixth embodiment.

Example 6-3

In an example 6-3, the preservation assembly 350 of the PEFC stack 200 of the sixth embodiment and the preservation assembly 330 of the PEFC stack 200 of the fourth embodiment were packaged in a sealed state. Specifically, the gas within the PEFC stack 200 identical to that of the example 3 has been replaced by nitrogen as in the example 3. Thereafter, the sealing plugs 60 were attached to the oxidizing agent passage outlet 30b and the reducing agent passage outlet 40b, and the replacement gas containers 51 are attached to the oxidizing agent passage inlet 30a and the reducing agent passage inlet 40a to seal them.

As the replacement gas containers 51, gas tanks filled with nitrogen were used.

As in the example 6-1, the preservation assembly 330 of the PEFC stack 200 was packaged in a sealed state in the package element.

The preservation assemblies 350 and 330 of the PEFC stack 200 of the example 6-3 were preserved under the room temperature (25° C.) for 5000 hours. Then, as in the example 3, the rated power operation was carried out.

[Performance Evaluation 7 Based on Rated Power Operation]

Figure 17:
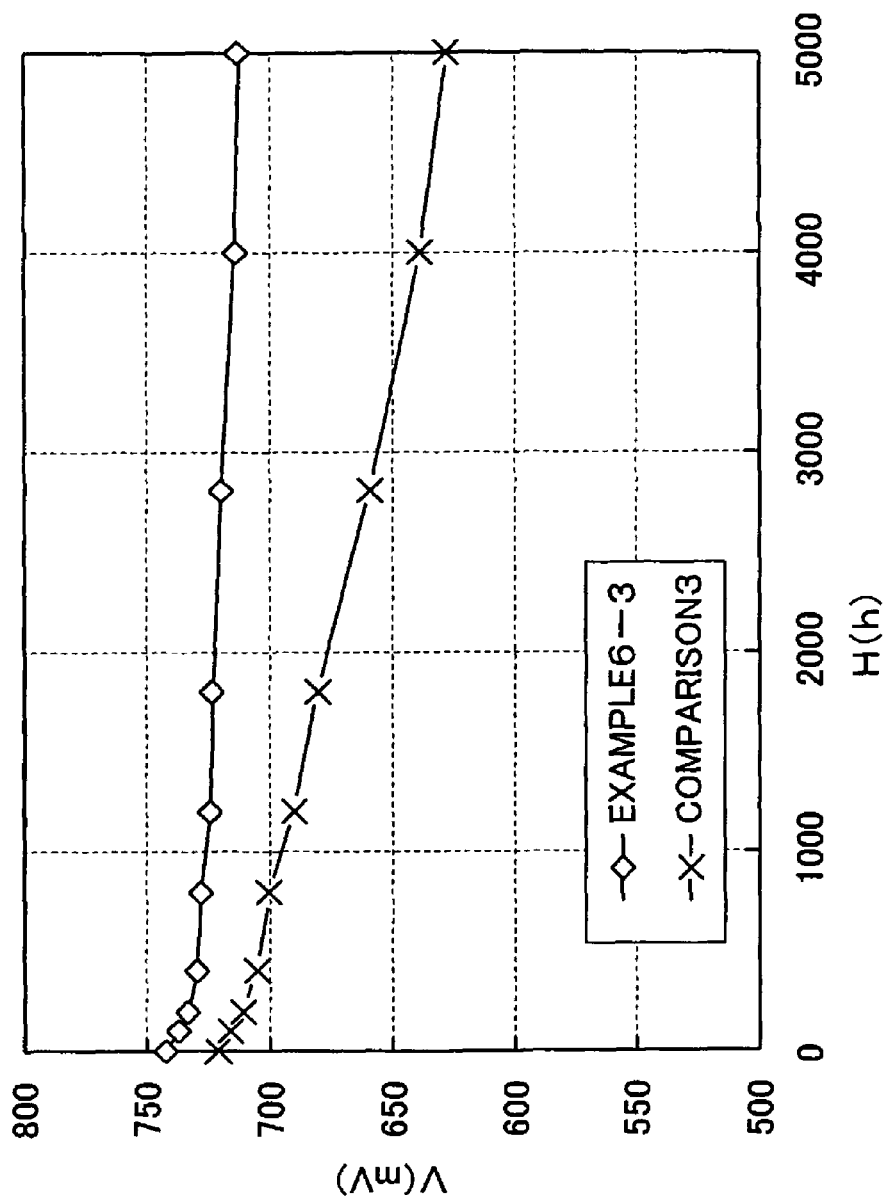
FIG. 17 is a view showing time-lapse variations in average cell voltages in the rated power operation of PEFC stacks of an example 6-3 and the comparison 3.

FIG. 17 is a view showing time-lapse variations in average cell voltages in the rated power operation of the PEFC stacks of the example 6-3, and the comparison 3. As shown in FIG. 17, in the PEFC stacks 200 of the example 6-3, the average voltage of the respective cells 100 was not substantially decreased after a long time operation. In this manner, it was confirmed that degradation of durability of the PEFC stack 200 was controlled by the preservation method of the PEFC stack 200 of the sixth embodiment.

In the example 3, the example 6-1, the example 6-2, the example 6-3, and the comparison 3, similar effects were obtained using helium or argon as the replacement gas. Also, in these examples, similar effects were obtained using hydrogen which is a non-oxidization gas as the replacement gas.

Embodiment 7

A seventh embodiment of the present invention illustrates that steps S1 and S2 are performed as in the first to sixth embodiments after the PEFC stack 200 is caused to perform a power generation process. Since a construction of a preservation assembly 360 of the PEFC stack 200 is similar to those of the first to sixth embodiments, it will not be further described, and a preservation method of the PEFC stack 200 will be described.

Figure 18:
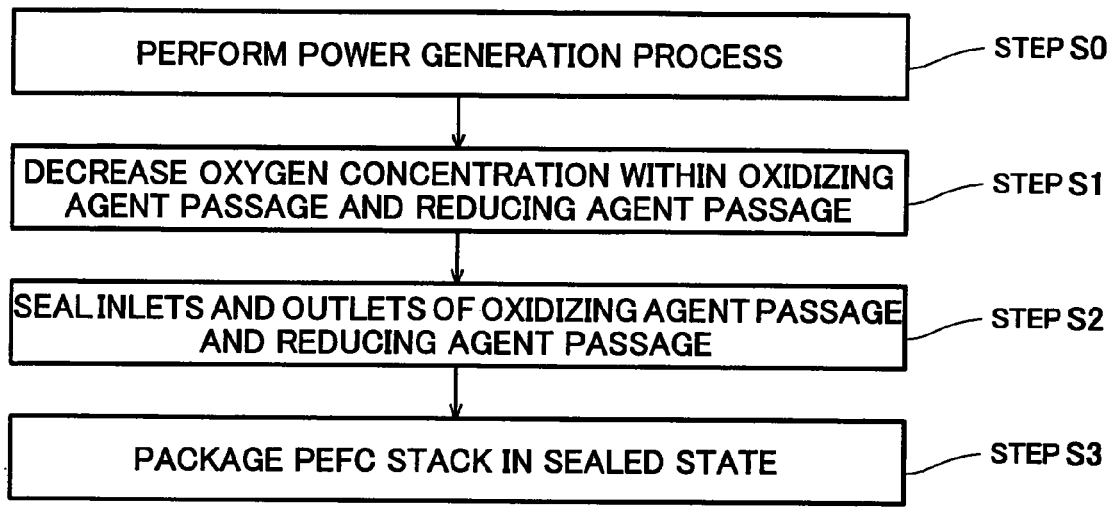
FIG. 18 is a block diagram showing a method of preserving a PEFC stack according to a seventh embodiment of the present invention.

FIG. 18 is a block diagram showing the preservation method of the PEFC stack 200 of the seventh embodiment of the present invention. As shown in FIG. 18, in the preservation method of the PEFC stack 200, in step (power generation process step) S0, the PEFC stack 200 in an uninstalled state is caused to continue generating power at a predetermined current density during a predetermined power generation time period. As in the first to sixth embodiments, steps S1 to step S3 are performed.

In step S0, specifically, the PEFC stack 200 was maintained at an operating temperature, a power load is electrically connected between the current collecting plates 41, and a reducing agent and an oxidizing agent are supplied to the anode and the cathode, respectively, causing an electrochemical reaction to occur in the PEFC stack 200. The electrochemical reaction is continued at a predetermined current I for a predetermined power generation time period T.

Since the preservation method of the PEFC stack 200 of the seventh embodiment allows the solvent or unwanted substances such as the metal, remaining within the PEFC stack 200, for example, inside of catalyst pores of the MEA 10 to be discharged outside the PEFC stack 200 along with the water generated through the electrochemical reaction in the power generation process, degradation of performance of the PEFC stack 200 is controlled more reliably.

The current density I in the power generation process is suitably not less than $0.1 \text{ A/cm}^2$ and not more than $0.4 \text{ A/cm}^2$ per area of the catalyst layers 2 and 3 of the MEA 10. It may be assumed that with such a current density, water generation in the electrochemical reaction in the MEA 10 becomes uniform.

The power generation time period T in the power generation process is suitably at least 3 hours so that the solvent and the unwanted substances are discharged outside the PEFC stack 200 along with the generated water.

The power generation time period T in the power generation process is suitably set to a time period that elapses until a voltage variation (dV/dt) per cell at the end of the power generation process is decreased to 2 mV/h or less. It may be judged based on reduction of the voltage variation that the solvent and the unwanted substances have been removed from the PEFC stack 200, because the voltage is stabilized by removal of the solvent and the unwanted substances.

The power generation process is performed suitably within 300 hours after manufacturing the PEFC stack 200. Considering progress of degradation of the catalyst and/or progress of degradation of a joint state between the polymer electrolyte membrane 1 and the electrode catalyst layers 2 and 3, which is caused by the solvent and the unwanted substances, the power generation process is desirably performed as early as possible after manufacturing the PEFC stack 200. Specifically, progress of performance degradation of the PEFC stack 200 can be avoided if the power generation process is performed within 300 hours after manufactured.

The dew point of the oxidizing agent and the reducing agent in the power generation process is suitably within a range of −10° C. to +10° C. of the temperature of the MEA 10 in the power generation process. At such a dew point, the water is sufficiently supplied to the MEA 10, and water clogging in the oxidizing agent passage 30 and the reducing agent passage 40, i.e., flooding, is controlled. As a result, the electrochemical reaction occurs uniformly in all of the MEAs 10. In other words, since the solvent and the unwanted substances can be discharged smoothly from all of the MEAs 10, degradation of performance of the PEFC stack 200 is controlled more reliably.

Hereinbelow, specific examples of the step S0 of the seventh embodiment of the present invention will be described, and the step S0 is not intended to be limited to the examples below.

In the examples and comparisons below, hydrogen was used as the reducing agent and air was used as the oxidizing agent in the power generation process. The power generation process was carried out in such a manner that the air and the hydrogen temperature-increased and humidified were supplied to the oxidizing agent passage 30 and the reducing agent passage 40, respectively while adjusting the reducing agent utilization ratio to be 70% and the oxidizing agent utilization ratio to be 40% and while keeping the PEFC stack 200 at 70° C. After the power generation process, the PEFC stack 200 was preserved at a room temperature and an ordinary humidity for 8 weeks. The preservation period (8 weeks) is an example of a period of the present invention in which performance of the polymer electrolyte membrane 1 may degrade due to the solvent and the unwanted substances.

Example 7-1

After manufacturing the PEFC stack 200, the PEFC stack 200 was preserved at a room temperature and an ordinary humidity for 1 week. The PEFC stack 200 was caused to carry out a power generation process under the condition in which the current density was I=0.4 A/cm² and the power generation time period was T=3 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and an ordinary humidity for 8 weeks.

Comparison 7-1

The PEFC stack 200 manufactured in the same period as that of the example 7-1 continued to be preserved at a room temperature and an ordinary humidity. In other words, the PEFC stack 200 was preserved at the room temperature and the ordinary humidity during a time period that elapsed from when the PEFC stack 200 of the example 7-1 was manufactured until a preservation period ended after the power generation process.

Comparison 7-2

After manufacturing the PEFC stack 200, the PEFC stack 200 was preserved at a room temperature and an ordinary humidity for 1 week. Hydrogen and air humidified to have a dew point of 70° C. were temperature-increased up to 70° C. and were supplied to the reducing agent passage 40 and the oxidizing agent passage 30, respectively, for 3 hours. After that, the PEFC stack 200 was preserved at a room temperature and an ordinary humidity for 8 weeks during which the power generation process was not carried out.

The PEFC stacks 200 of the example 7-1, the comparison 7-1, and the comparison 7-2 were caused to continue the rated power operation for 1000 hours under the condition in which the fuel gas utilization ratio was 70%, the oxidizing gas utilization ratio was 40%, and the current density was 0.2 A/cm² in such a manner that hydrogen and air humidified to have a dew point of 70° C. were temperature-increased up to 70° C. and were supplied to the reducing agent passage 40 and the oxidizing agent passage 30, respectively while keeping the PEFC stack 200 at 70° C. Table 1 shows voltage drop amount ΔV of each of the example 7-1, the comparison 7-1, and the comparison 7-2 in the rated power operation.

TABLE 1

| | ΔV (mV) |
|---|---|
| EXAMPLE 7-1 | 10 |
| COMPARISON 7-1 | 100 |
| COMPARISON 7-2 | 90 |

The table 1 clearly shows that the voltage drop amount ΔV is smaller in the example 7-1 than in the comparison 7-1, and the comparison 7-2. From this result, it was confirmed that the power generation process allows degradation of performance of the PEFC stack 200 to be controlled more reliably.

Example 7-2

After manufacturing the PEFC stack 200, the PEFC stack 200 was preserved at a room temperature and an ordinary humidity for 1 week. The PEFC stack 200 was caused to carry out a power generation process in such a manner that hydrogen and air humidified to have a dew point of 70° C. were temperature-increased up to 70° C. and were supplied to the reducing agent passage 40 and the oxidizing agent passage 30, respectively under the condition in which the current density was I=0.1 A/cm² and the power generation time period was T=12 h. After the power generation process, the PEFC stack 200 went through the step S1 and was preserved at a room temperature and an ordinary humidity for 8 weeks.

Comparison 7-3

After manufacturing the PEFC stack 200, the PEFC stack 200 was preserved at a room temperature and an ordinary humidity for 1 week. The PEFC stack 200 was caused to carry out a power generation process under the condition in which a current density was I=0.5 A/cm² and a power generation time period was T=12 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and an ordinary humidity for 8 weeks.

Comparison 7-4

After manufacturing the PEFC stack 200, the PEFC stack 200 was preserved at a room temperature and an ordinary humidity for 1 week. The PEFC stack 200 was caused to carry out a power generation process under the condition in which the current density was I=0.5 A/cm² and the power generation time period was T=3 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and an ordinary humidity for 8 weeks.

Comparison 7-5

After manufacturing the PEFC stack 200, the PEFC stack 200 was preserved at a room temperature and an ordinary humidity for 1 week. The PEFC stack 200 was caused to carry out a power generation process under the condition in which the current density was I=0.4 A/cm² and the power generation time period was T=2 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and an ordinary humidity for 8 weeks.

As in the example 7-1, the PEFC stacks 200 of the example 7-2, the comparison 7-3, the comparison 7-4, and the comparison 7-5 were caused to continue the rated power operation for 1000 hours under the condition in which the fuel gas utilization ratio was 70%, the oxidizing gas utilization ratio was 40%, and the current density was 0.2 A/cm² in such a manner that hydrogen and air humidified to have a dew point of 70° C. were temperature-increased up to 70° C. and were supplied to the reducing agent passage 40 and the oxidizing agent passage 30, respectively while keeping the PEFC stack 200 at 70° C.

Table 2 shows the current density I and the power generation time period T in the power generation process, voltage variation (dV/dt) at termination of the power generation process, and the voltage drop amount ΔV in the rated power operation of each of the example 7-1, the example 7-2, the comparison 7-3, the comparison 7-4, and the comparison 7-5.

TABLE 2

|  | I (A/cm$^2$) | T (h) | dV/dt (mV/h) | ΔV (mV) |
|---|---|---|---|---|
| EXAMPLE 7-1 | 0.4 | 3 | 1.5 | 10 |
| EXAMPLE 7-2 | 0.1 | 12 | 0.0 | 8 |
| COMPARISON 7-3 | 0.05 | 12 | 5.0 | 50 |
| COMPARISON 7-4 | 0.5 | 3 | 3.0 | 70 |
| COMPARISON 7-5 | 0.4 | 2 | 4.5 | 60 |

As can be seen from comparison between the example 7-1 and the comparison 7-4, and comparison between the example 7-2 and the comparison 7-3, the voltage drop amounts ΔV are smaller in the example 7-1 and the example 7-2 than in the comparison 7-3 and the comparison 7-4. From this, the current density in the power generation process is suitably in a range of 0.1 A/cm$^2$ to 0.4 A/cm$^2$. It may be assumed that, with the current density in this range, water generation in the electrochemical reaction in the MEA 10 is uniform.

In the example 7-1 and the example 7-2, the voltage variations (dV/dt) at the termination of the power generation process are decreased to 1.5 mV/h or less, in contrast to the comparison 7-3, the comparison 7-4, and the comparison 7-5. It may be assumed that the solvent and the unwanted substances have been sufficiently discharged from the interior of the PEFC stack 200 when the voltage variation (dV/dt) is decreased to approximately 1.5 mV/h or less, because the voltage variation (dV/dt) occurs when the solvent and the substances remaining inside the PEFC stack 200, especially in the bores inside the electrode catalyst layers 2 and 3 are discharged outside the PEFC stack 200 along with the water generated through the electrochemical reaction.

As can be seen from comparison between the example 7-1 and the comparison 7-5, the voltage drop amount ΔV is smaller in the example 7-1 than in the comparison 7-5. Therefore, the power generation time period T in the power generation process is suitably 3 hours or more, because at least 3 hours may be required to discharge the solvent and the substances from the PEFC stack 200.

Example 7-3

After manufacturing the PEFC stack 200, the PEFC stack 200 was preserved at a room temperature and an ordinary humidity for 300 hours, i.e., 2 weeks. In the example 7-3, the period W (week) before the power generation process is expressed as W=2. The PEFC stack 200 was caused to carry out a power generation process under the condition in which the current density was I=0.4 A/cm$^2$ and the power generation time period was T=3 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and an ordinary humidity for 8 weeks.

Comparison 7-6

After manufacturing the PEFC stack 200, the PEFC stack 200 was preserved at a room temperature and an ordinary humidity for 500 hours, i.e., about 3 weeks. In the comparison 7-6, the period W (week) before the power generation process is expressed as W=3. The PEFC stack 200 was caused to carry out a power generation process under the condition in which the current density was I=0.4 A/cm$^2$ and the power generation time period was T=3 h in such a manner that hydrogen and air humidified to have a dew point of 70° C. were temperature-increased up to 70° C. and were supplied to the reducing agent passage 40 and the oxidizing agent passage 30, respectively. After the power generation process, the PEFC stack 200 went through the step S1 and was preserved at a room temperature and at an ordinary humidity for 8 weeks.

As in the example 7-1, the PEFC stacks 200 of the example 7-3 and the comparison 7-6 were caused to continue the rated power operation for 1000 hours under the condition in which the fuel gas utilization ratio was 70%, the oxidizing gas utilization ratio was 40%, and the current density was 0.2 A/cm$^2$ in such a manner that hydrogen and air humidified to have a dew point of 70° C. were temperature-increased up to 70° C. and were supplied to the reducing agent passage 40 and the oxidizing agent passage 30, respectively while keeping the PEFC stack 200 at 70° C.

Table 3 shows the time period W before the power generation process, the current density I and the power generation time period T in the power generation process, the voltage variation (dV/dt) at termination of the power generation process, and the voltage drop amount ΔV in the rated power operation of each of the example 7-1, the example 7-3, and the comparison 7-6. As described above, in the example 1, the PEFC stack 200 was preserved at a room temperature and an ordinary humidity for about 1 week, to be precise, 150 hours. The time period W (week) before the power generation process of the example 1 was expressed as W=1.

TABLE 3

|  | W (week) | I (A/cm$^2$) | T (h) | dV/dt (mV/h) | ΔV (mV) |
|---|---|---|---|---|---|
| EXAMPLE 7-1 | 1 | 0.4 | 3 | 1.5 | 10 |
| EXAMPLE 7-3 | 2 | 0.4 | 3 | 2.0 | 12 |
| COMPARISON 7-6 | 3 | 0.4 | 3 | 1.5 | 80 |

As can be seen from comparison between the example 7-1, the example 7-3, and the comparison 7-6, the voltage drop amounts ΔV are smaller in the example 7-1 and the example 7-3 than in the comparison 7-6. Therefore, the time period W before the power generation process is suitably within W=2. In brief, the power generation process is suitably carried out within 300 hours after the PEFC stack 200 is manufactured.

Example 7-4

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm$^2$ and the power generation time period was T=3 h in such a manner that hydrogen and air humidified to have a dew point 60° C. were temperature-increased up to 60° C. and were supplied to the reducing agent passage 40 and the oxidizing agent passage 30, respectively while keeping the PEFC stack 200 at 70° C. Here, temperature difference ΔS between the PEFC stack 200 which is the reference, and the oxidizing agent and the reducing agent in the power generation process was set to −10° C. After the power generation process, the PEFC stack 200 went through the step S1 and was preserved at a room temperature and an ordinary humidity for 8 weeks.

Example 7-5

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation time period was T=3 h in such a manner that hydrogen and air humidified to have a dew point of 80° C. were temperature-increased up to 80° C. and were supplied to the reducing agent passage 40 and the oxidizing agent passage 30, respectively while keeping the PEFC stack 200 at 70° C. Here, temperature difference ΔS between the PEFC stack 200 which is the reference, and the oxidizing agent and the reducing agent in the power generation process was set to +10° C. After the power generation process, the PEFC stack 200 went through the step S1 and was preserved at a room temperature and an ordinary humidity for 8 weeks.

Comparison 7-7

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation time period was T=3 h in such a manner that hydrogen and air humidified to have a dew point 50° C. were temperature-increased up to 50° C. and were supplied to the reducing agent passage 40 and the oxidizing agent passage 30, respectively while keeping the PEFC stack 200 at 70° C. Here, temperature difference ΔS between the PEFC stack 200 which is the reference, and the oxidizing agent and the reducing agent in the power generation process was set to −20° C. After the power generation process, the PEFC stack 200 went through the step S1 and was preserved at a room temperature and an ordinary humidity for 8 weeks.

Comparison 7-8

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation time period was T=3 h in such a manner that hydrogen and air humidified to have a dew point 85° C. were temperature-increased up to 85° C. and were supplied to the reducing agent passage 40 and the oxidizing agent passage 30, respectively while keeping the PEFC stack 200 at 70° C. Here, temperature difference ΔS between the PEFC stack 200 which is the reference, and the oxidizing agent and the reducing agent in the power generation process was set to +15° C. After the power generation process, the PEFC stack 200 went through the step S1 and was preserved at a room temperature and an ordinary humidity for 8 weeks.

The PEFC stacks 200 of the example 7-4, the example 7-5, the comparison 7-7 and the comparison 7-8 were caused to continue the rated power operation for 1000 hours under the condition in which the fuel gas utilization ratio was 70%, the oxidizing gas utilization ratio was 40% and the current density was I=0.2 A/cm² in such a manner that hydrogen and air humidified to have a dew point of 70° C. were temperature-increased up to 70° C. and were supplied to the reducing agent passage 40 and the oxidizing agent passage 30, respectively while keeping the PEFC stack 200 at 70° C. Table 4 shows the current density I, the power generation time period T and the temperature difference ΔS in the power generation process, the voltage variation (dV/dt) at termination of the power generation process, and the voltage drop amount ΔV in the rated power operation of each of the example 7-4, the example 7-5, the comparison 7-7 and the comparison 7-8.

TABLE 4

| | I (A/cm²) | T (h) | ΔS (° C.) | dV/dt (mV/h) | ΔV (mV) |
|---|---|---|---|---|---|
| EXAMPLE 7-4 | 0.4 | 3 | −10 | 1.5 | 15 |
| EXAMPLE 7-5 | 0.4 | 3 | +10 | 2.0 | 14 |
| COMPARISON 7-7 | 0.4 | 3 | −20 | 3.0 | 55 |
| COMPARISON 7-8 | 0.4 | 3 | +15 | 5.0 | 65 |

Table 4 clearly shows that the voltage drop amounts ΔV are smaller in the example 7-4 and the example 7-5 than in the comparison 7-7 and the comparison 7-8. Therefore, the temperature difference ΔS in the power generation process is suitable in a range of −10° C. to +10° C. It may be assumed that, when the temperature difference ΔS is outside the range of −10° C. to +10° C., a non-uniform electrochemical reaction occurs in the MEA 10 because of water deficiency in the MEA 10, causing the solvent and the substances to be insufficiently discharged from the interior of the PEFC stack 200, in particular from the interior of the pores within the electrode catalyst layers 2 and 3.

As can be seen from the table 4, the voltage variations (dV/dt) in the example 7-4 and the example 7-5 is 2.0 mV/h or less and the voltage variations (dV/dt) in the comparison 7-7 and the comparison 7-8 is above 2.0 mV/h. From this result and the result of the table 2, it may be assumed that, when the voltage variation (dV/dt) is decreased to approximately 2.0 mV or less, the solvent and the substances have been sufficiently discharged from the interior of the PEFC stack 200. It is therefore desirable to continue the power generation process until the voltage variation (dV/dt) is decreased to 2.0 mV or less.

As should be appreciated from the foregoing, the preservation method of the PEFC stack and the preservation assembly of the PEFC stack of the present invention can lessen oxygen which contacts the oxidizing agent side electrode catalyst layer and the reducing agent side electrode catalyst layer and can thereby control oxidization of the solvent remaining in these electrode catalyst layers. As a result, degradation of performance of the PEFC stack in the uninstalled state is controlled. In addition, since the PEFC stack in the uninstalled state is caused to perform the power generation process, degradation of performance of the PEFC stack is further controlled.

The preservation method of the PEFC stack and the preservation assembly of the PEFC stack of the present invention are not intended to be limited to the embodiments described above, and are applicable to a variety of preservation methods and preservation assemblies of the PEFC stack within a scope of the invention.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

The invention claimed is:

1. A method of preserving a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, the method comprising the step of:

preserving the polymer electrolyte fuel cell stack in an uninstalled state under a condition in which an oxygen concentration within the oxidizing agent passage and within the reducing agent passage is lower than an oxygen concentration in atmospheric air wherein the uninstalled state is a state after manufacture of the polymer electrolyte fuel cell stack and before permanent incorporation of the polymer electrolyte fuel cell stack into a fuel cell system.

2. The method of preserving a polymer electrolyte fuel cell stack according to claim 1, further comprising the steps of:

decreasing the oxygen concentration within the oxidizing agent passage and within the reducing agent passage of the polymer electrolyte fuel cell stack in the uninstalled state to less than the oxygen concentration in atmospheric air; and sealing the inlet and the outlet of the oxidizing agent passage within which the oxygen concentration has been decreased and the inlet and the outlet of the reducing agent passage within which the oxygen concentration has been decreased.

3. The method of preserving a polymer electrolyte fuel cell stack according to claim 2, in the step of decreasing the oxygen concentration, the oxygen concentration within the oxidizing agent passage and within the reducing agent passage is decreased to not less than 10 ppm and not more than $1 \times 10^3$ ppm.

4. The method of preserving a polymer electrolyte fuel cell stack according to claim 2, the step of decreasing the oxygen concentration includes filling a replacement gas in the oxidizing agent passage and the reducing agent passage; and the step of sealing the inlets and the outlets includes attaching sealing units to the inlet and the outlet of the oxidizing agent passage filled with the replacement gas and to the inlet and the outlet of the reducing agent passage filled with the replacement gas.

5. The method of preserving a polymer electrolyte fuel cell stack according to claim 4, wherein at least one of the sealing units used in the step of sealing the inlets and the outlets includes an oxygen removing agent container comprised of a connecting portion having an opening connected to the oxidizing agent passage or to the reducing agent passage and a base portion filled with an oxygen removing agent therein, and wherein the connecting portion is provided with an element that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage.

6. The method of preserving a polymer electrolyte fuel cell stack according to claim 4, wherein at least one of the sealing units used in the step of sealing the inlets and the outlets includes a replacement gas container comprised of a connecting portion having an opening connected to the oxidizing agent passage or the reducing agent passage and a base portion filled with a replacement gas therein, and wherein the connecting portion is provided with a device that is capable of sealing the inlet and the outlet of the oxidizing agent passage and the inlet and the outlet of the reducing agent passage with the connecting portion attached to the inlet and the outlet of the oxidizing agent passage and to the inlet and the outlet of the reducing agent passage and that is capable of maintaining an ejecting pressure of the replacement gas within a predetermined range.

7. The method of preserving a polymer electrolyte fuel cell stack according to claim 4, wherein at least one of the sealing units used in the step of sealing the inlets and the outlets includes a sealing plug.

8. The method of preserving a polymer electrolyte fuel cell stack according to claim 2, the step of decreasing the oxygen concentration includes filling water in the oxidizing agent passage and the reducing agent passage; and the step of sealing the inlets and the outlets includes attaching sealing units to the inlet and the outlet of the oxidizing agent passage filled with the water and to the inlet and the outlet of the reducing agent passage filled with the water.

9. The method of preserving a polymer electrolyte fuel cell stack according to claim 2, further comprising the step of:

maintaining the polymer electrolyte fuel cell stack at a temperature of higher than 0° C. and not higher than 25° C. after the step of sealing the inlets and the outlets.

10. The method of preserving a polymer electrolyte fuel cell stack according to claim 2, further comprising the step of:

after the step of sealing the inlets and the outlets, packaging the polymer electrolyte fuel cell stack in a sealed state in a package element.

11. The method of preserving a polymer electrolyte fuel cell stack according to claim 10, wherein the package element includes a flexible package element, and the polymer electrolyte fuel cell stack is packaged in the sealed state by bonding the package element.

12. The method of preserving a polymer electrolyte fuel cell stack according to claim 10, wherein the package element includes a rigid body container comprised of a base portion and a lid, and the polymer electrolyte fuel cell stack is packaged in the sealed state by joining the base portion and the lid to each other.

13. The method of preserving a polymer electrolyte fuel cell stack according to claim 10, wherein the package element includes a package element that is low in oxygen permeability.

14. A method of preserving a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, the method comprising the steps of:

causing the polymer electrolyte fuel cell stack to perform a power generation process, decreasing the oxygen concentration within the oxidizing agent passage and within the reducing agent passage of the polymer electrolyte fuel cell stack in an uninstalled state to less than the oxygen concentration in atmospheric air;

sealing the inlet and the outlet of the oxidizing agent passage within which the oxygen concentration has been decreased and the inlet and the outlet of the reducing agent passage within which the oxygen concentration has been decreased; and preserving the polymer electrolyte fuel cell stack in the uninstalled state under a condition in which an oxygen concentration within the oxidizing agent passage and within the reducing agent passage is lower than an oxygen concentration in atmospheric air;

wherein the uninstalled state is a state after manufacture of the polymer electrolyte fuel cell stack and before permanent incorporation of the polymer electrolyte fuel cell stack into a fuel cell system.

15. The method of preserving a polymer electrolyte fuel cell stack according to claim 14, wherein in the step of causing the polymer electrolyte fuel cell stack to perform the power generation process, a current density is not less than 0.1 A/cm$^2$ and not more than 0.4 A/cm$^2$ per area of the electrode catalyst layers.

16. The method of preserving a polymer electrolyte fuel cell stack according to claim 14, wherein in the step of causing the polymer electrolyte fuel cell stack to perform the power generation process, a power generation time period is 3 hours or more.

17. The method of preserving a polymer electrolyte fuel cell stack according to claim 14, wherein in the step of causing the polymer electrolyte fuel cell stack to perform the power generation process, a power generation time period is a time period that elapses until a voltage variation is decreased to 2 mV/h or less.

18. The method of preserving a polymer electrolyte fuel cell stack according to claim 14, wherein the step of causing the polymer electrolyte fuel cell stack to perform the power generation process is performed within 300 hours after the polymer electrolyte fuel cell stack is manufactured.

* * * * *